US012642732B2

(12) United States Patent (10) Patent No.: US 12,642,732 B2

Arzanpour et al. (45) Date of Patent: Jun. 2, 2026

(54) SYSTEM FOR GUIDING MOTIONS OF A TARGET JOINT

(71) Applicant: Human In Motion Robotics Inc., North Vancouver (CA)

(72) Inventors: Siamak Arzanpour, North Vancouver (CA); Jung Wook Park, Surrey (CA); Liam Page, Surrey (CA); Shaun Paul Bourgeois, Surrey (CA); Behzad Peykari, Vancouver (CA)

(73) Assignee: HUMAN IN MOTION ROBOTICS INC., North Vancouver (CA)

( * ) Notice: Subject to any disclaimer, the term of this patent is extended or adjusted under 35 U.S.C. 154(b) by 1035 days.

(21) Appl. No.: 17/777,608

(22) PCT Filed: Sep. 5, 2020

(86) PCT No.: PCT/CA2020/051204

§ 371 (c)(1),
(2) Date: May 17, 2022

(87) PCT Pub. No.: WO2021/108892

PCT Pub. Date: Jun. 10, 2021

(65) Prior Publication Data

US 2022/0401284 A1 Dec. 22, 2022

Related U.S. Application Data

(60) Provisional application No. 62/943,163, filed on Dec. 3, 2019.

(51) Int. Cl.
*A61H 3/00* (2006.01)
*A61H 1/02* (2006.01)
*B25J 9/00* (2006.01)

(52) U.S. Cl.
CPC ............... *A61H 3/00* (2013.01); *A61H 1/024* (2013.01); *A61H 1/0244* (2013.01);
(Continued)

(58) Field of Classification Search
CPC ...... A61H 3/00; A61H 1/0262; A61H 1/0244; A61H 1/0281; B25J 9/0006
See application file for complete search history.

(56) References Cited

U.S. PATENT DOCUMENTS 7,862,524 B2    1/2011   Carignan et al.
8,070,700 B2   12/2011   Kazerooni et al.
(Continued)

FOREIGN PATENT DOCUMENTS

CN         103330635 B    11/2014
CN         109223449 A    1/2019
(Continued)

OTHER PUBLICATIONS

International Search Report in International Application No. PCT/CA2020/051204 issued Nov. 26, 2020.
(Continued)

*Primary Examiner* — Brandy S Lee
*Assistant Examiner* — Kelsey Rhee

(57) ABSTRACT

Examples of a motion guiding device of a target joint of a target body are disclosed. The device allows three degree-of-freedom (DOF) motion about a remote center of rotation that is approximately aligned to a center of rotation of the target joint. The device comprises a base adjustably connected to the target body and three rotary joints interconnected with a network of linkages. One end of the network of linkages is connected to the base and the opposite end to an effector plate. At least one of the three rotary joints is not aligned with an axes of motion of the target joint and any of these rotary joints may be positioned under angle with
(Continued)

respect to the others. Each of the rotary joints provides one DOF of rotary motion about the respective axes and each axis of the three rotary joints intersect at the remote center of rotation. The geometry of the network of linkages is adjustable to adjust a position of the remote center of rotation in three dimensions. The three rotary joints and the network of linkages rotate the effector plate about the remote center of rotation that is approximately align with the center of rotation of the target joint. This system may be connected with one or more parallel branches for additional actuation.

16 Claims, 29 Drawing Sheets

(52) U.S. Cl.
CPC ......... *A61H 1/0262* (2013.01); *A61H 1/0266* (2013.01); *B25J 9/0006* (2013.01); *A61H 2003/007* (2013.01); *A61H 2201/1215* (2013.01); *A61H 2201/123* (2013.01); *A61H 2201/1623* (2013.01); *A61H 2201/1626* (2013.01); *A61H 2201/1642* (2013.01); *A61H 2201/165* (2013.01); *A61H 2201/1676* (2013.01); *A61H 2201/5007* (2013.01); *A61H 2201/5023* (2013.01); *A61H 2201/5061* (2013.01); *A61H 2201/5064* (2013.01); *A61H 2201/5069* (2013.01); *G05B 2219/40305* (2013.01)

(56) References Cited

U.S. PATENT DOCUMENTS

| | | | |
|---|---|---|---|
| 11,135,120 B2 | 10/2021 | Arzanpour et al. | |
| 11,135,122 B2 | 10/2021 | Arzanpour et al. | |
| 2010/0036302 A1 | 2/2010 | Shimada et al. | |
| 2012/0010749 A1 | 1/2012 | Van Der Merwe et al. | |
| 2014/0005577 A1 | 1/2014 | Goffer | |

FOREIGN PATENT DOCUMENTS

| | | | | |
|---|---|---|---|---|
| WO | 2012042471 A1 | 4/2012 | | |
| WO | WO-2017167349 A1 * | 10/2017 | ............ | B25J 18/007 |
| WO | WO-2018093448 A2 * | 5/2018 | ........... | A61H 1/0285 |

OTHER PUBLICATIONS

Written opinion on Patentability of International Application No. PCT/CA2020/051204 issued Nov. 20, 2020.

* cited by examiner

SYSTEM FOR GUIDING MOTIONS OF A TARGET JOINT

CROSS REFERENCE TO RELATED APPLICATIONS

This application is a U.S. National Stage Application of International application No. PCT/CA2020/051204 filed Sep. 5, 2020, which claims priority from U.S. Patent Application No. 62/943,163 filed on Dec. 3, 2019. The entirety of all the above-listed applications are incorporated herein by their reference.

FIELD OF INVENTION

This invention relates to a system for guiding motions of three degree-of-freedom rotary joints or joint systems and a motion system for tracking and/or actuating a motion of a target body employing the motion guiding devices to assist movement of the target body.

BACKGROUND OF INVENTION

Unless otherwise indicated herein, the materials described in this section are not prior art to the claims in this application and are not admitted to be prior art by inclusion in this section.

With respect to medical exoskeleton applications, an estimated 20,639,200 (7.1%) of non-institutionalized United States residents suffered from an ambulatory disability in 2013, while an approximated 2,512,800 (7.2%) of Canadians reported mobility disablements in 2012. These disabilities cost an estimated annual equivalent of $375 billion in family caregiver support, in addition to significant economic and social burdens to the patient and the healthcare system.

One emergent technology that aims to diminish this health problem and improve the quality of life for sufferers is the powered lower-body exoskeleton: wearable robotic systems that completely or partially support their user's weight and provide controlled guidance of leg movements, thereby allowing their user to stand and walk. This solution provides benefits over wheelchair use and other traditional means because it can also help reduce secondary complications of immobility such as pneumonia, blood clots, pressure sores, and lowered self-esteem. However, one major shortcoming of current exoskeleton technologies is a limited range of motion about the hip and ankle joints, which are both capable of three rotary degrees-of-freedom (DOFs) in the human body. In general, current technologies use three rotary elements, each of which corresponds to one of the three motions (flexion/extension, abduction/adduction, internal/external rotation, as shown in FIG. 1), wherein each joint axis is perpendicular to the one before it and has an axis that runs in the same direction as one of these motions. However, the internal/external rotation axis of the hip joint is vertical, passing inside of the torso and leg in the area near the hip, and therefore it is inaccessible for direct alignment by any mechanical parts. Usually, to overcome this problem, the rotary element for internal/external rotation can be displaced to a joint that runs in the same direction but does not intersect the hip joint. This can allow the system to have 3-DOFs, but not around a single center point (as the joint axes do not intersect all at one point) and, as a result, the movement of the device does not match the motion of the user. Alternatively, the system can employ a more complicated joint that is able to create a remote center of rotation within the body. This can allow the system to have three purely rotary DOFs, as the one disclosed in a co-pending international application number PCT/CA2019/050640 (Publication No. WO2019/218056), however such systems of remote centering mechanisms/joints are more complex.

SUMMARY OF THE INVENTION

In one aspect, a motion guiding device that allows three degree-of-freedom (DOF) motion about a remote center of rotation that is approximately aligned to a center of rotation of a target joint of a target body is provided. The device comprises a base structure connected to the target body via a base linkage and a base orthotic structure, three rotary joints interconnected with a network of linkages such that the network of linkages do not mechanically interfere with the target body, and one end of the network of linkages is connected to the base structure. At least one of the rotary joints is unaligned with an axis of motion of the target joint. Each of the rotary joints provides one DOF of rotary motion about a respective axis such that each axis of the three rotary joints intersects at a remote center of rotation. A geometry of the network of linkages is adjustable to adjust a position of the remote center of rotation in three dimensions. The device further comprises an effector plate that is attached to the network of linkages at the other end such that an attachment point of the effector plate is adjustable via a plate adjustment system. The effector plate is connected to the target point via an adjustable plate orthotic system such that a point of connection of the effector plate to the target body is spaced apart from a point of connection between the base structure and the target body. The three rotary joints and the network of linkages are rotating the effector plate about the remote center of rotation that is approximately aligned with the center of rotation of the target joint.

In another aspect, at least one of the rotary joints is a rotary actuator that actuates the at least one rotary joint. The motion guiding device further comprises a controller comprising an input unit, a processing unit and an output unit. The output unit is operably coupled with the at least one rotary actuator to direct motion of the motion guiding device. A plurality of sensors are also provided to measure a position and/or orientation of the three joints or the network of linkages, as well as the forces/torques acting between the linkages and the joints and the forces/torques acting between the motion guiding device and its environment.

In yet another aspect, the motion guiding device comprises at least one actuator branch that is operably coupled at one end to one linkage of the network of linkages at a first point of attachment and to a second point of attachment at the opposite end. The at least one actuator branch comprises at least one rotary actuator, one or more rotary joints and a system of linkages. The at least one actuator branch is configured to actuate motion in at least one of the 3 rotary joints and the effector plate.

In one aspect, the second point of attachment of the actuator branch is connecting the actuator branch to the base structure.

In another aspect, at least one additional actuator branch is provided. The at least one additional actuator branch is operably coupled at one end to one linkage of the network of linkages at a first point of attachment and to a second point of attachment at the opposite end. The at least one additional actuator branch comprising at least one rotary actuator, one or more rotary joints and a system of linkages, and is configured to actuate motion in at least one of the 3 rotary joints and the effector plate.

In yet another aspect, a motion guidance assistance system is provided. The system comprises a motion guiding device of the present invention, at least one additional joint system connected in series with the motion guiding device and a controller in communication with the motion guiding device and the at least one additional joint system. The controller is configured to actuate and coordinate motions of the motion guiding device and the at least one additional joint system.

In addition to the aspects and embodiments described above, further aspects and embodiments will become apparent by reference to the drawings and study of the following detailed description.

DETAILED DESCRIPTION OF SPECIFIC EMBODIMENTS

Figure 1:
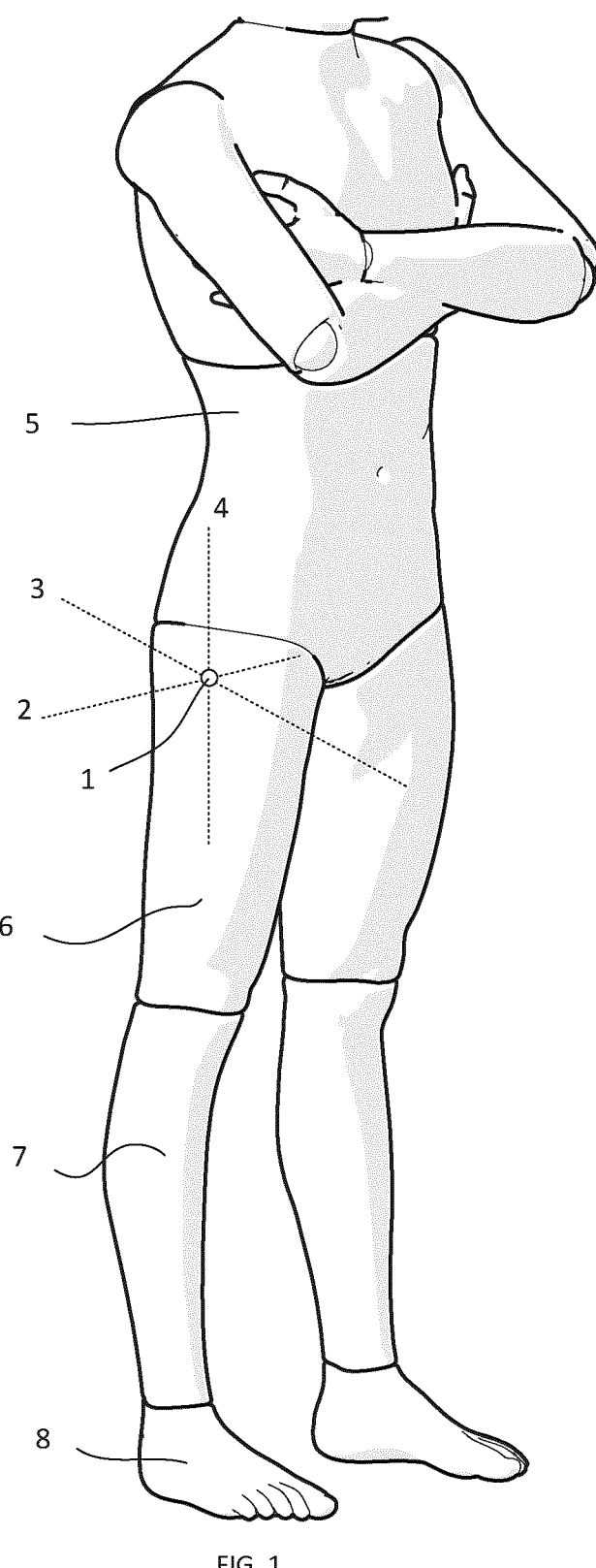
FIG. 1 is a perspective view of a user showing axes of motions of a hip joint.

This application discloses a motion guiding device that uses only rotary joints while still allowing a purely spherical motion at the hip by changing the angle and direction of the joints such that none of the joints interfere with the body but still intersect at the target joint. The constraints regarding alignment and perpendicularity can be eliminated, the rotary joints do not necessarily need to align with a particular motion or be perpendicular to other joints, allowing potentially compact, robust and wearable spherical motion structures. The motion guiding devices of the present invention can be used for actuating or tracking a movement of a target body containing a three degree of freedom (DOF) ball-and-socket joint or quasi ball-and-socket joint. The device can be generally load-bearing, which is to say it may transmit certain forces exerted at one point of the system to another point on the device, and can be connected in series with additional passive or active joint devices so as to actuate or track the motions of additional target joints. The motion guiding device of the present application can provide the functionality described above by creating a remote center of rotation that may be (approximately) aligned with the target joint center of rotation, such that the joint and linkage system of the motion guiding device does not mechanically interfere with elements of the target body for certain geometries and certain ranges of motion. Embodiments of the motion guiding device can act as a hip exoskeleton module that can track/actuate three DOFs of the hip joint while not interfering with the body of the user (for particular motions). Embodiments of the aforementioned motion guiding devices can be interconnected in series with additional actuation structures/systems to actuate other joints in the wearer's body.

For the sake of illustration, the center of rotation of the embodiments presented will be considered to be aligned with the center of rotation of the target joint of the user, though this may not necessarily be the case in actuality. Several possible actuation schemes, both in series and parallel, for various embodiments of these devices will be presented and additional actuation schemes will be discussed herein below. For the purposes of this document, a statement that a body (or system) "interferes" or demonstrates "mechanical interference" or "interference" with another body usually describes the occurrence of these two objects or bodies intersecting or impacting with each other under some circumstance. The term body as used here can denote any physical object or entity. This can also apply to systems of multiple bodies where "interference" might constitute one or more bodies of one system intersecting or impacting one or more other bodies that may constitute or be part of another system. Generally, particular components shown in the figures are for illustration purposes only and are not meant to necessarily represent, in size, geometry or any particular aspect, realistic properties or dimensions. For the purposes of this application a joint or device or system is referred to as active if all degrees of freedom of the joint or system are controlled or actuated. A joint or device or system is referred to as semi-active if at least one but not all degrees of freedom of the joint or device or system are controlled or actuated. A joint or device or system is referred to as passive if no degrees of freedom of the joint or device or system are controlled or actuated. Usually a joint is passive unless otherwise specified. The term "exoskeleton" may be used in this application to refer to any of the devices/structures/systems presented throughout this document.

FIG. 1 illustrates a general user (or wearer) of any system presented in subsequent figures. For illustration purposes of this description, a center of rotation of the user's right hip joint, on average, is considered to be located at a point 1. The motions of axes 2, 3 and 4 are termed flexion/extension, abduction/adduction and internal/external rotation and are meant to encompass the 3-DOF rotary capacity of the hip. Additionally, the axes 2, 3 and 4 intersect at the average hip center of rotation 1. To clarify, the axis 2 is horizontal and is aligned from right to left across the body. The axis 3 is also horizontal but is aligned from front to back through the body. The axis 4 is vertical. Additionally, the user's body is considered to comprise several parts such as, torso 5, upper leg 6, lower leg 7 and foot 8. The left leg and the left hip joint center of rotation is considered to be symmetric to the right leg. For the purposes of this application, the "neutral position" of the user will generally be a posture similar to that shown in FIG. 1. Certain devices may be presented as being worn only on the right or left side of the user, however, a person skilled in the art could understand that a system of similar (and potentially mirrored or opposing) structure could apply to the opposite side.

Figure 2:
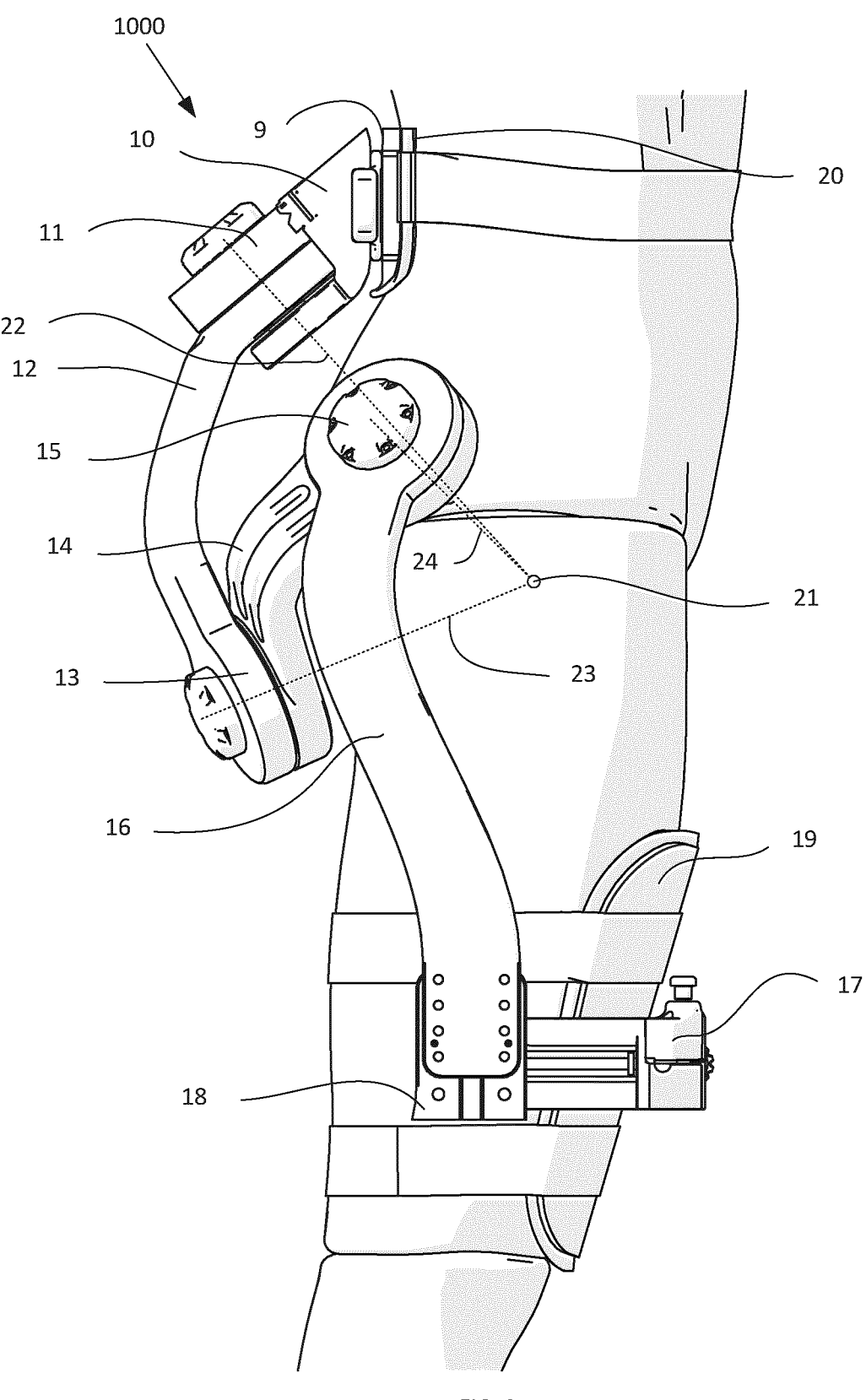
FIG. 2 is a perspective view of an example of a motion guiding device mounted to a user with three rotary joints to allow three-DOF motion about a center of rotation that is aligned with the center of rotation of user's hip joint.

FIG. 2 illustrates a motion guiding device 1000 that allows three DOF motion about a center of rotation 21 that may be (approximately) aligned with the center of rotation 1 (FIG. 1) of the user's hip joint. The device 1000 includes a base 9 which is attached to a linkage 10. The base 9 has multiple interface locations and, as such, the attachment point of the base 9 and the linkage 10 may be adjusted by detaching the linkage 10 and fastening it to the base 9 at a different location point along one axis. The linkage 10 is attached to a linkage 12 via a first rotary joint 11. The linkage 12 is in turn attached to a linkage 14 via a second rotary joint 13. The linkage 14 is then attached to a linkage 16 via a third rotary joint 15. The linkage 16 is rigidly attached to an effector plate 18 such that the position of attachment can be adjusted via an adjustment mechanism that can be similar to the one that allows adjustment between the base 9 and the linkage 10. For example, the adjustment mechanism can be a rail mechanism 25 illustrated in FIG. 3 or any other suitable adjustment mechanism. The base structure 9 is connected to the torso of the user via an orthotic structure 20. The effector plate 18 is connected to the thigh of the user via an orthotic structure 19 and an adjustable linkage 17. The rotary joints 11, 13 and 15 each provide one DOF of rotary motion about the axes 22, 23 and 24, respectively, and each axis 22, 23 and 24 passes through the center of rotation 21 so that the axes of these rotary joints intersect at this common point 21. Additionally, the overall geometries of the linkages 12, 14 and 16 may be adjustable such that the center of rotation 21 can be adjusted in three dimensions. It can be seen that the positions of the rotary joints 11, 13 and 15 and the geometries of the linkages 12, 14 and 16, as represented in this illustration, allow the device to be worn by the user without interfering with the user's body (for certain postures/positions). The axes 22, 23 and 24 are not restricted to any particular orientation with respect to each other and may have many configurations (the axes may be, for example, non-orthogonal). The joints connecting the linkages 12, 14, 10 and 16 to their respective adjacent components (not including attachment to the user) comprise solely one-DOF rotary joints (the joints 11, 13 and 15), and curvilinear joints that by themselves create remote centers of rotation are not employed in motion guiding device 1000. Additionally, none of the joint axes 22, 23 and 24, when in the neutral position (the position depicted in the FIG. 1), are constrained to necessarily be aligned with the biological axes of motion 2, 3 and 4 of FIG. 1 (being the axes of hip flexion/extension, abduction/adduction, internal/external rotation, respectively) although this may occur in some embodiments. The device 1000 allows the effector plate 18 to rotate in three DOFs about the center of rotation 21 for complete set of motions attainable by a target joint (i.e. a hip joint) or a subset of such motions. Additionally, the device 1000 can constrain the effector plate 18 to rotate about the center of rotation 21 and prohibit other forms of movement, such as up/down or side-to-side translation motions relative to the base 9. The device 1000 can allow the flexion/extension, abduction/adduction and internal/external rotation at the target joint (e.g. hip joint) although none of the axes 22, 23 or 24 align with the target joint axes 2, 3 or 4 and the positions and geometries of the various rotary joints and linkages of the device 1000 allow it to be worn without causing interference with the body of the user. The prevention of mechanical interference is made possible by placing the rotary joints 11, 13 and 15 in positions that do not coincide with the biological axes 2, 3 and 4 (see FIG. 1) and by not constraining these joints to be mutually orthogonal.

Figure 3:
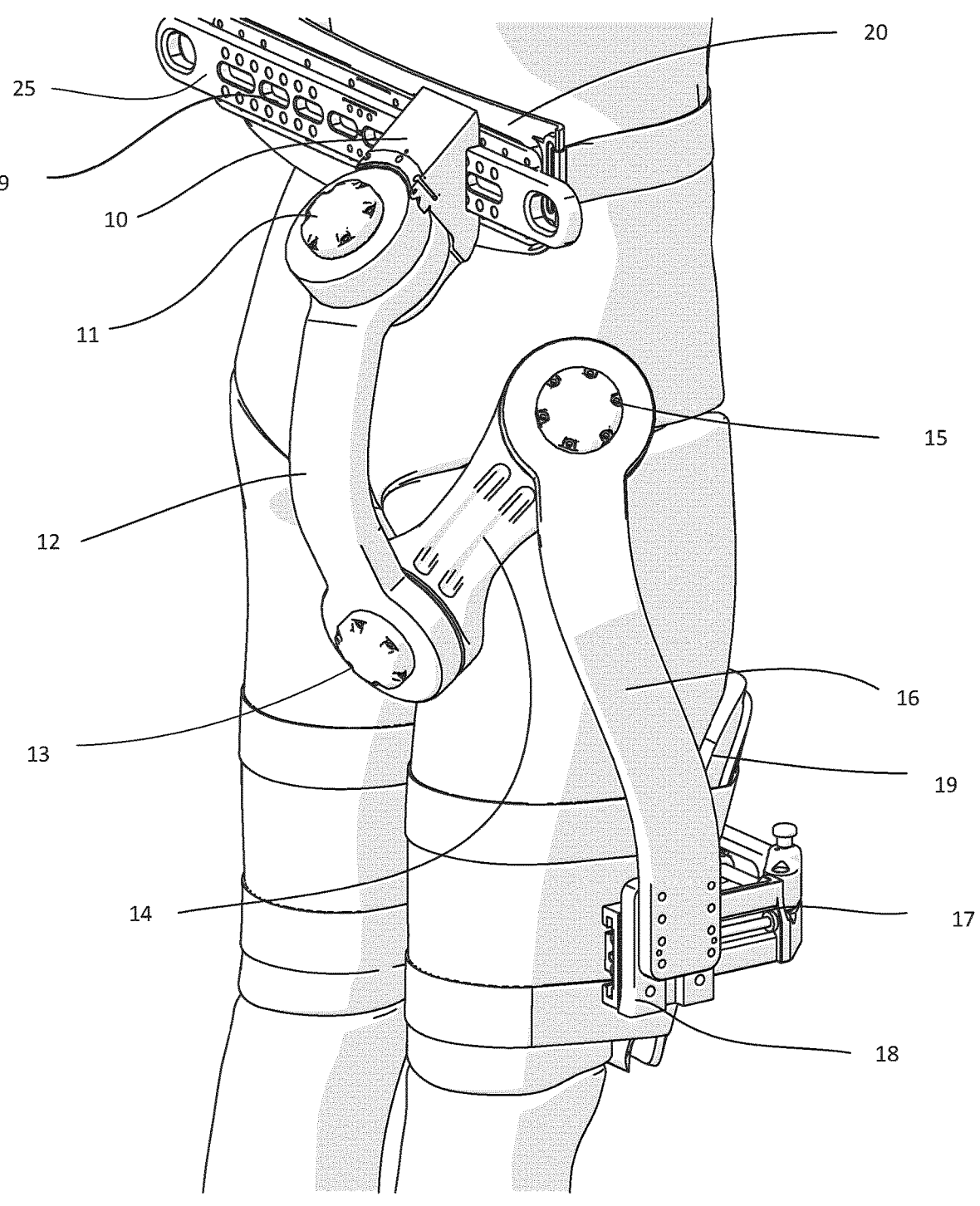
FIG. 3 is a perspective view of the motion guiding device of FIG. 2 showing an adjustment mechanism for adjusting a position of the rotary joints with respect to a base of the motion guiding device.

FIG. 3 illustrates another view of the motion guiding device 1000 showing the adjustment mechanism 25 which has been hidden in the view in FIG. 2.

Figure 4:
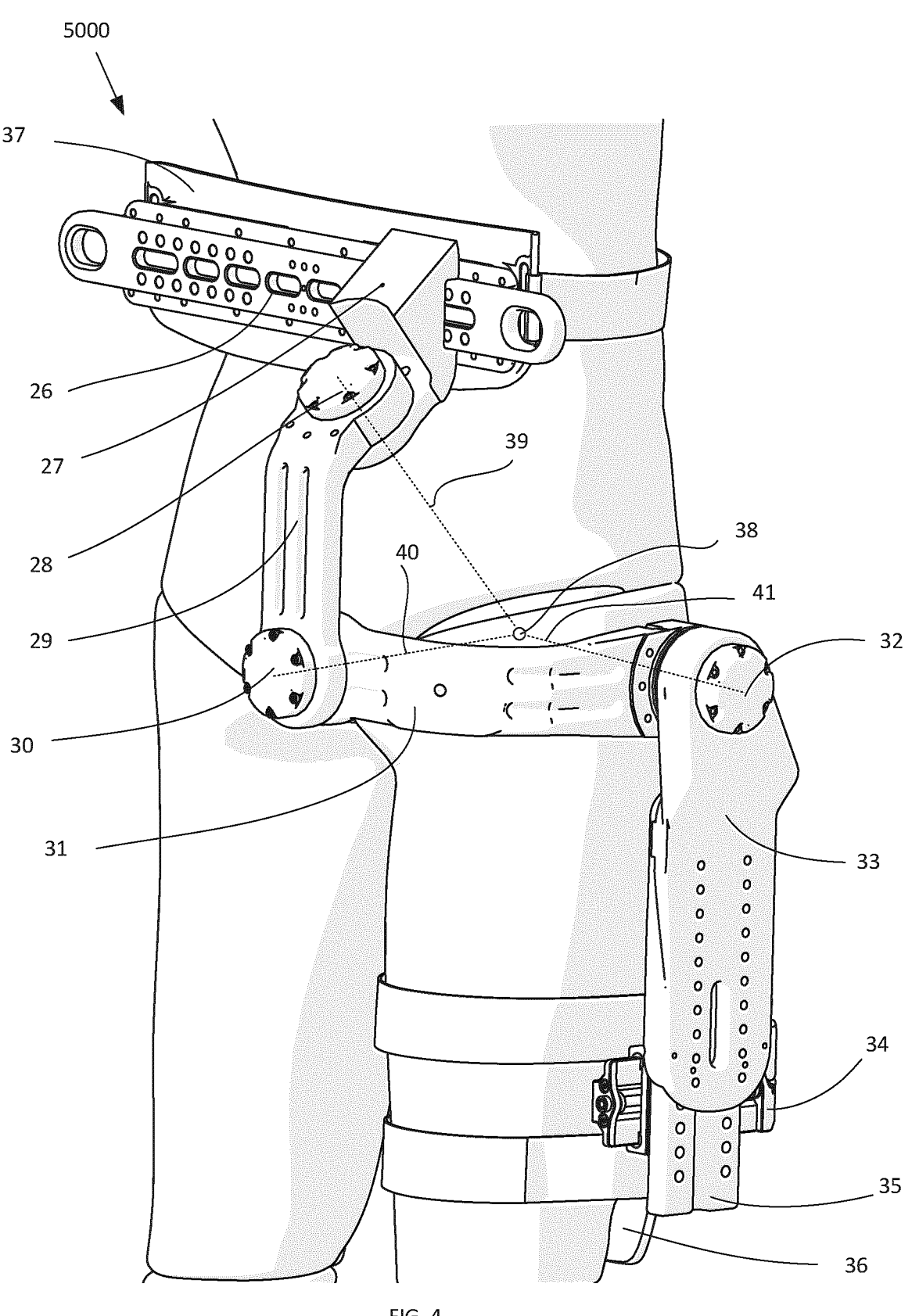
FIG. 4 is a perspective view of another embodiment of a motion guiding device with different geometries and positions of rotary joints.

FIG. 4 illustrates a motion guiding device 5000 which is an embodiment of the system 1000 where the positions of the rotary joints 28, 30 and 32 as well as the geometries of the links 29, 31 and 33 are different than the positions and geometries of the respective joints and linkages of the depiction of the device 1000 shown in FIG. 2. In the neutral position shown in FIG. 4, the axis of rotation 40 of rotary joint 30 is coincident with the axis 3 (see FIG. 1) of the abduction/adduction motion of hip joint and the axis of rotation 41 of the rotary joint 32 is coincident with the axis 2 (see FIG. 1) of the flexion/extension motion (though this may not be the case for all postures). The axis of rotation 39 of the rotary joint 28 is not coincident with any of the axes 2, 3 or 4 (see FIG. 1) of the standard biological motions of the hip joint and is not orthogonal to the axis 30. In addition, the axis 39 is not perpendicular to the transverse plane of the body. The axes 40 and 41 are orthogonal. The device 5000 allows (and constrains) the effector plate 35 to rotate with three DOFs about the center of rotation 38 for a particular set of motions without interfering with the body of the user. The allowable motions provided by the device 5000, as well as other properties for the device 5000, such as the required space of mechanical components, are different in comparison with the device 1000 of FIG. 2 and may be more suitable for some applications, such as, for example, when a large range of motion is required for one of the motions (such as flexion/extension) with an aligned joint. The device 5000 can allow for internal/external rotation of the target joint (e.g., the hip joint) although none of the joints 28, 30 and 32 align with the axis 4 (see FIG. 1) of the internal/external rotation motion. Additionally, placing this joint 28 at an angle to the axis 4 allows for the device to be worn (via the orthotic systems 36 and 37) without interference to the body of the user.

Figure 5:
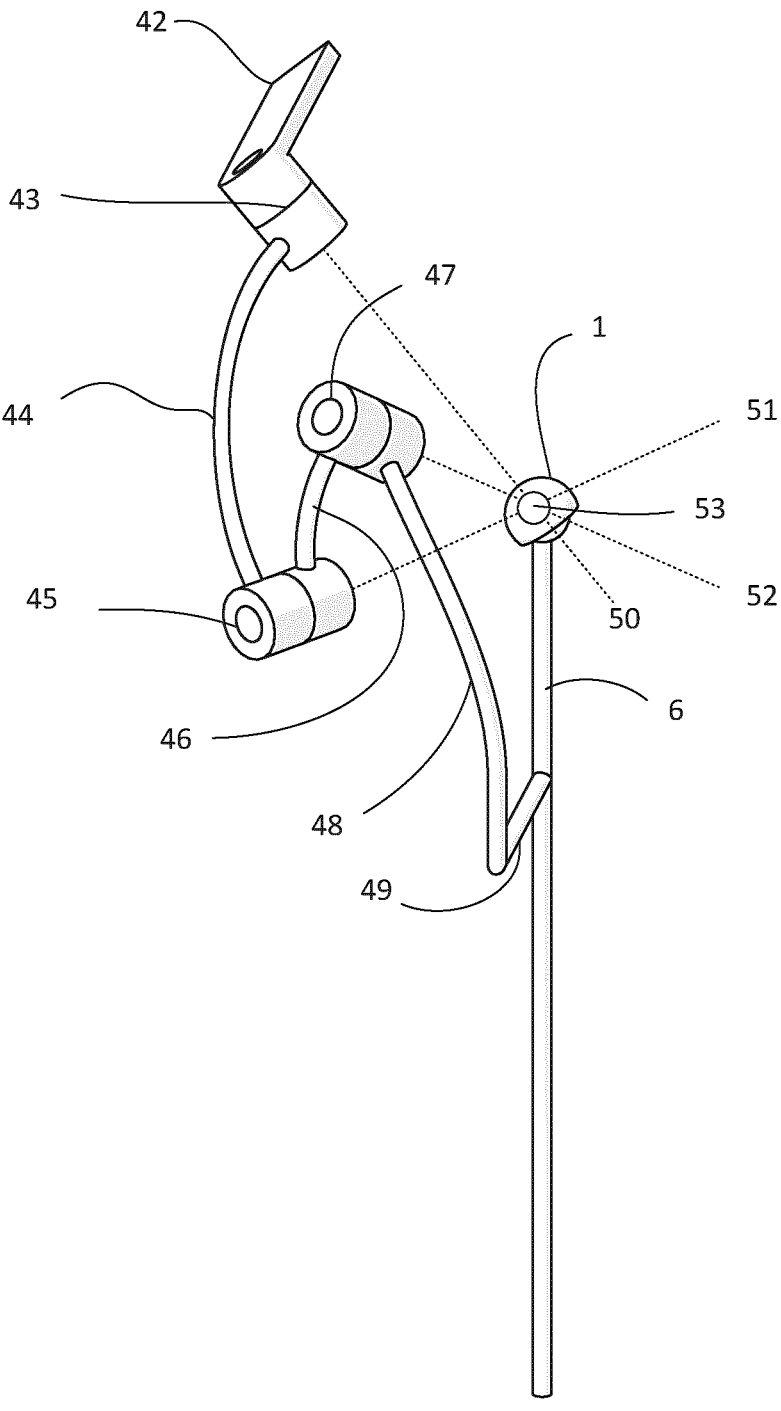
FIG. 5 is a mechanical schematic view showing general structure of a motion guiding device.

FIG. 5 illustrates a simplified schematic drawing showing the general structure of the motion guiding devices 1000 and its various embodiments (such as the motion guiding device 5000). A linkage 42 (analogous to linkage 10 and 27 of devices 1000, 5000 respectively) connects a base (not shown in the figure) and a rotary joint 43 which is analogous to rotary joints 11 and 28 of devices 1000, 5000 respectively. The rotary joint 43 connects to a rotary joint 45 via a linkage 44. The rotary joint 45 is analogous to rotary joints 13 and 30 of devices 1000, 5000 while the linkage 44 is analogous to linkages 12 and 29 of devices 1000, 5000 respectively. The rotary joint 45 then connects to a rotary joint 47 (analogous to rotary joints 15 and 32 of devices 1000, 5000) via a linkage 46 which is analogous to linkages 14 and 31 of devices 1000, 5000 respectively. The rotary joint 47 then connects to an effector linkage 48. The effector linkage 48 then connects to the upper leg 6 of the user via an interface 49. Though referred to as an effector linkage, the effector linkage 48 may also comprise an effector plate (which can act as the attachment point for the interface 49) which has been omitted for clarity (as it is rigidly connected to the effector linkage). Generally, throughout this document, descriptions of components being connected to the effector linkage 48 may also include the possibility of said component connecting at such an effector plate. The effector linkage 48 may be referred to, throughout this document, as a linkage, for simplicity. The linkage 16 and the effector plate 18 of device 1000 are together analogous to the effector linkage 48 as are the linkages 33 and 35 of device 5000. The adjustable linkage 17 and the orthotic system 19 of device 1000 together are analogous to the connection 49, as are the adjustable linkage 34 and the orthotic system 36 of device 5000.

The rotary joints 43, 45 and 47 have axes of rotation 50, 51 and 52, respectively, that intersect at a point 53 that is approximately aligned with the average hip joint center 1 of the user (see FIG. 1). As such, the effector linkage 48 can rotate with 3-DOFs about the point 53. In general, the various linkages may have varied geometries provided that: each of the joint axes 50, 51 and 52 of the rotary joints 43, 45 and 47 intersect at the point 53 (which is approximately aligned with the user average hip joint center 1); none of the axes 50, 51 or 52 become coincident with each other within the target workspace; the axes 50, 51 and 52 are not at any point coincident with a single plane within the target workspace; and the motion guiding device can avoid interference with the target body and is mechanically feasible. The dimensions of the various linkages and joints shown in FIG. 5 are for illustration purposes only and are not meant to demonstrate any particular geometric relations other than those stated.

The positions and alignments of the three consecutive rotary joints (43, 45 and 47) are not restricted to being orthogonal with each other nor coincident with pre-defined motion axes (such as motion axes 2, 3 and 4 of FIG. 1), and the geometries of the involved linkages 44, 46 and 48 are not restricted. Therefore, a person skilled in the art could understand that the motion guiding devices 1000, 5000 can have any geometry suitable for allowing three DOFs of rotation (and only 3-DOFs of rotation) of the effector plate about a remote center of rotation (which may be aligned with the center of rotation of the target joint) while avoiding mechanical interference with the user for a particular set of motions, and that all such structures are within the scope of this invention. The axes of the aforementioned rotary joints are not required to maintain orthogonality or to be coincident with any standard biological axes (for example, a joint axis may create an acute or obtuse angle with respect to the previous joint axis), allowing configurations that do not cause interference with the body of the user. Generally, at least one of the three rotary joints can maintain an alignment (in the neutral position) which is not coincident with any of the axes 2, 3 and 4 of the target joint (see FIG. 1) in order to prevent interference with the user. For example, in an alternative embodiment of the device 5000 the axes of rotation 40 and 41 of the rotary joints 30, B8 may not be exactly orthogonal and/or may not be coincident with the axes 3 and 2 of the target joint by shortening and/or altering linkages 27, 29, 31 and 33. Since the motion guiding devices 1000, 5000 employ only single-degree-of-freedom rotary joints (rather than curvilinear joints or remote-centering structures), such motion guiding devices have advantages in size, weight, robustness or other aspects compared to alternatives that use other joint types. Additionally, since the motion guiding devices 1000, 5000 constrain the end-effector 48 to move with a spherical motion that may be closely aligned with the target joint (e.g. hip center), such motion guiding systems can potentially demonstrate certain advantages regarding range of motion and/or usability (and/or other aspects) in wearable applications in comparison to structures that do not create a single center of rotation. In one embodiment, the motion guiding devices 1000, 5000 and/or any possible alternative embodiment of such devices can be employed within an exoskeleton device that guides or assists a motion of a user (that wears the motion guiding device) at a number of target joints. In another embodiment, the devices 1000, 5000 may be included in a wearable motion capture device wherein a number of sensors can be added to the joints to measure the orientation of the various linkages and attached bodies (and, by extension, a target joint of the user). In other embodiments, the motion guiding devices 1000, 5000 may be employed as a part of any active, passive or semi-active wearable device. In the event that the center of rotation of any of the aforementioned devices does not coincide with the average center of rotation 1 of the user's target joint, the connection between the user and the orthotics can be made compliant so as to account for this misalignment.

The motion guiding device of the present invention may be made fully or partially active by inclusion of actuators into the joints or through the addition of parallel branches connecting to any linkage(s) or joint(s) such that the motion guiding device may be actuated in series or in parallel. In some embodiments of the motion guiding device 1000 or 5000, some of the rotary joints may be replaced with actuated rotary joints (or rotary joints with sensing elements) and/or any of the linkages may be connected to additional linkage systems for the purpose of providing actuation or sensing.

Figure 6:
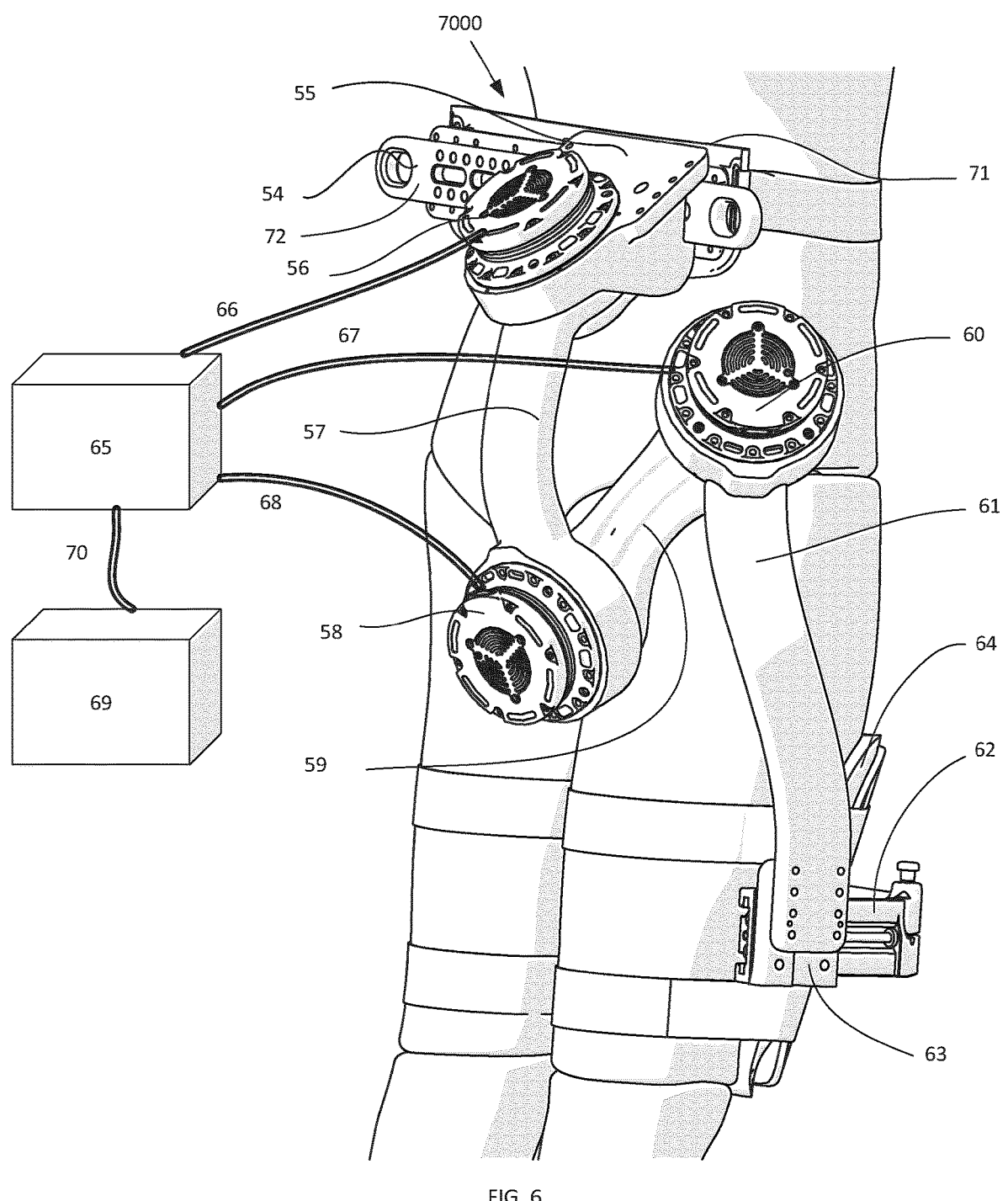
FIG. 6 is a perspective view of an example of an embodiment of a motion guiding device with three rotary actuators.

FIG. 6 illustrates a motion guiding device 7000 for guiding the motion of a target joint such as a user's hip joint that employs an embodiment of the motion guiding device 1000 where the rotary joints 11, 13, 15 of device 1000 have been replaced with rotary actuators 56, 58 and 60. The axis of rotation of each actuator aligns with the axis of rotation of the respective rotary joint that it replaces, and the linkages have been modified accordingly to accommodate the actuators, forming an active serial hip exoskeleton motion device 7000. A base structure 54 connects to the actuator 56 via a linkage 55. The actuator 56 then connects to the actuator 58 via a linkage 57. The actuator 58 then connects to the actuator 60 via a linkage 59. The actuator 60 then connects to an effector plate 63 via a linkage 61. Both the base 55 and the effector plate 63 are attached to the body of the user by a set of orthotics pieces 71 and 64, where the latter connects to the effector plate 63 via an adjustable linkage 62. The device 7000 retains the center of rotation similar to center of rotation 21 of the device 1000 and is be aligned (approximately) with the center of rotation 1 of the user's hip joint.

The device 7000 further comprises a control system 65 that can contain an input unit, a processing unit and an output unit. The output unit of the controller 65 may include actuators' drivers. Each of the actuators 56, 58 and 60 is in communication with the output unit of the control system 65. The controller 65 may be placed on-board the device 7000 or can be placed off-board on a separate structure. Additionally, each of the actuators 56, 58 and 60 can have a number of sensors that are in communication with the control system 65 to obtain the actuators' feedback. The input/output connections for each of the actuators 56, 58 and 60 are grouped into the general connections 66, 67 and 68, respectively. The control system 65 can further connect to a user interface system 69 via a connection 70. The user (wearer) can input commands using the user interface system 69, and the control system 65 directs the actuators 56, 58 and 60 to perform particular motions (with feedback yielded by the number of sensors) based on such input commands. The device 7000 allows for three DOF positioning of the user's target joint and is load bearing, as certain forces applied at one point of the system can be transferred to another point on the system without necessarily transferring through the body of the user.

The connection between the base 54 and the linkage 55 can be made adjustable such that the connection point can be moved with up to three DOFs relative to the base 54 using the rail mechanism 72 or any other kind of adjustment mechanism. The linkages 55, 57, 59 and 61 can have adjustable geometries via similar rail mechanisms or any other adjustment mechanism. These adjustment mechanisms can allow the center of rotation to be adjusted in up to three dimensions relative to the base 54. The user interface system 69 may include a touchscreen device(s), a joystick(s) and/or a push button(s) through which the user can command the device. Additionally (or alternatively), the user interface can include any other sensor for user intent detection such as inertial measurement units, EMG (electromyography) sensors, EEG (electroencephalogram) sensors and/or load sensors. For example, in one embodiment, an EEG sensor may be used to monitor the brain activity of the user and trigger motions based on these signals. In another embodiment, an IMU (inertial measurement unit) might be used to measure the tilt of the torso to predict user intention and trigger gait actions. Additionally, IMU sensors, rotary encoders, strain gauges or any other kind of sensor may also be integrated into the device so as to facilitate device control. Additionally, the device may contain a "backpack" unit that is rigidly attached to the base 54 in which various system components, such as the controller 65 or any additional components (e.g., a battery) can be placed. The actuators 56, 58 and 60 can be electric, hydraulic, pneumatic or any other type. While the device 7000 provides motion guiding functionality, a person skilled in the art would understand that the device 7000 can also provide motion assistance functionality. In the case that the device 7000 is used as an augmentation device for an individual who possesses some degree of muscle control, the device may instead be semi-active and one or two of the actuators 56, 58 or 60 that correspond to any degrees of freedom that do not require assistance can be removed and replaced with a passive joint. Optionally, for the semi-active case, a sensor group can then be added to the passive joint to monitor the motion of that joint. A person skilled in the art would understand that alternative embodiments of the device 7000 can apply to other biological (target) joints, provided that the underlying configuration of these embodiments allows the device to provide three DOFs of rotation about a center of rotation that can be (approximately) aligned with the center of rotation of the target joint and does not cause mechanical interference with the body of the user about that joint (for the target motions), and that all such embodiments and uses are also within the scope of this application.

Figure 7:
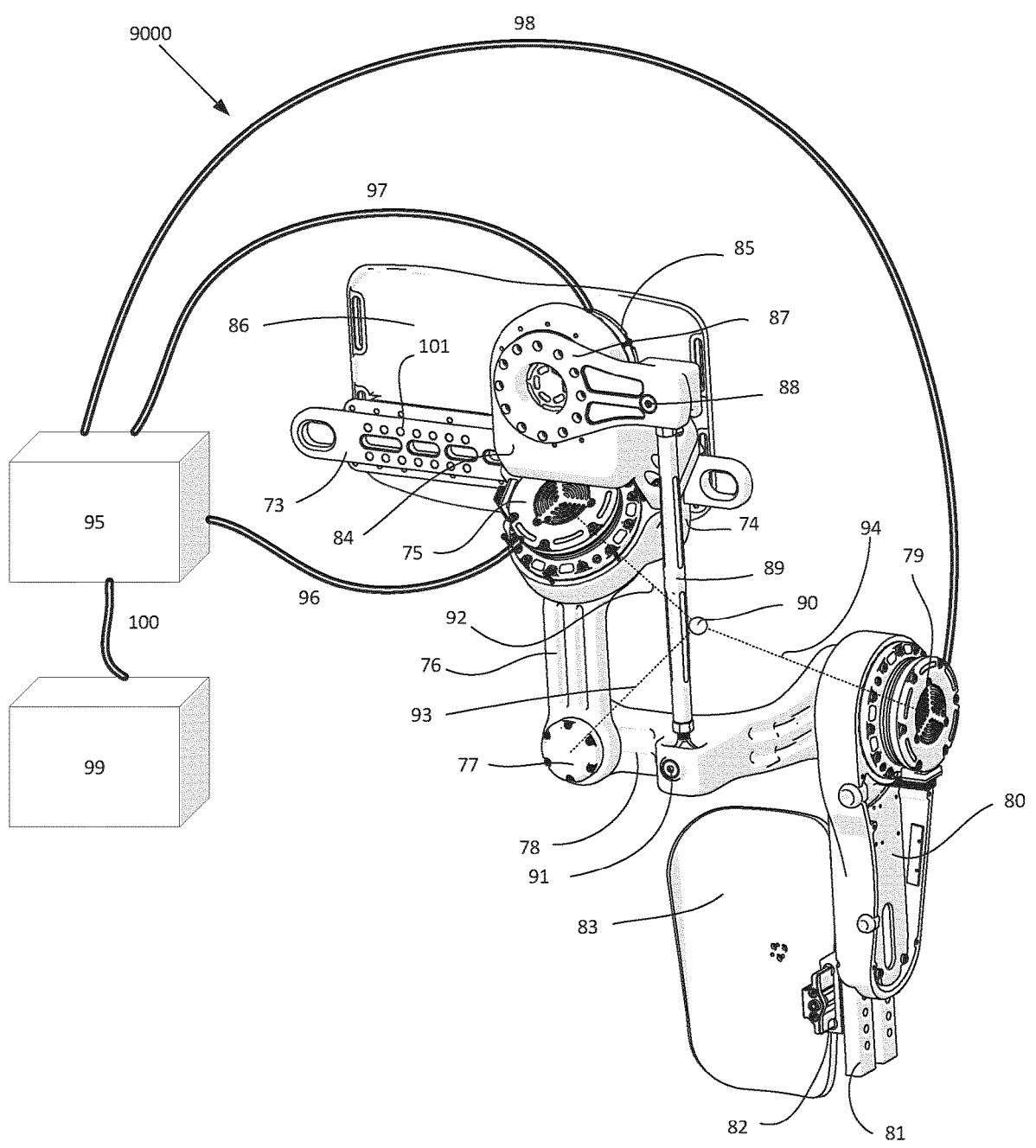
FIG. 7 is a perspective view of an example of another embodiment of a motion guiding device with two rotary actuators and one rotary joint and a parallel branch to indirectly actuate the rotary joint.

FIG. 7 illustrates another device 9000 for guiding the motion of a user's target joint employing an embodiment of the motion guiding device 1000 (depicted as the motion guiding device 5000). The device 9000 comprises rotary actuators 75 and 79, a rotary joint 77 and a base 73. The base 73 can comprise a rail 101 and connects to a mount 74. The connection point between the base 73 and the mount 74 may be adjusted such that it may lie at any of a number of points along the rail. The mount 74 is connected to one side of the actuator 75, which connects to a linkage 76, which then connects to a linkage 78 via the joint 77. The linkage 78 then connects to the linkage 80 via the actuator 79. The linkage 80 is then attached rigidly to an effector plate 81 such that the point of attachment can be adjusted. The axes of rotation of the actuators 75 and 79, as well as the axes of the joint 77, intersect at the center of rotation 90, which may be (approximately) aligned with the point 1 of the user's target joint. The base structure 73 is connected to the torso of the user via an orthotic system 86, and the effector plate 81 is connected to the thigh of the user via an orthotic system 83 and the adjustable linkage 82. The device 9000 is further actuated indirectly through a parallel branch that comprises an actuator 85 that is connected to the mount 84 (the mount 84 being connected to the base 73 via the mount 74). The actuator 85 is then connected to a linkage 87 which is, in turn, connected to a linkage 89 via a spherical joint 88. The linkage 89 is then connected to a linkage 78 of the motion guiding device via a spherical joint 91. Therefore, the parallel branch for indirectly actuating the device 9000 includes the actuator 85, spherical joints 88 and 91, linkages 87 and 89, and the mount 84.

The device 9000 further comprises a control system 95 that contains an input unit, a processing unit and an output unit. The output unit of the controller 95 may include actuator drivers. Each of the actuators 75 and 79 as well as the actuator 85 is in communication with the output unit of a control system 95. The control system 95 can be placed on-board the device 9000 or off-board on a separate structure. Additionally, the actuators 75, 85 and 79 can each have a sensor group that connects to the control system 95 for obtaining actuator feedback. The actuators 75 and 79 are connected to the input/output units of the controller 95 with connections 96 and 98, respectively, while the actuator 85 is in communication with the controller 95 using the connection 97. The control system 95 can also connect to a user interface system 99 via a connection 100. The user (wearer) can input commands using the user interface system 99, and the control system 95 directs the actuators 75, 79 and the actuator 85 to perform particular motions (with feedback yielded by the number of sensors) based on such input commands. The device 9000 allows for three-DOF positioning of the user's target joint (e.g. hip joint). The actions of the actuators 75, 77 and the actuator 85 create a corresponding action at the target joint 1. The device 9000 can be load bearing, as certain forces applied at one point of the system can be transferred to another point on the system without necessarily transferring through the body of the user. The action of the actuator 75 and the actuator 85 (via the connecting linkage 89) contribute to the action of the passive rotary joint 77 and can be said to actuate such passive joint in parallel, allowing the possibility of torque-sharing in certain embodiments. Therefore, actuator 85, mount 84, linkage 87, linkage 89 and a spherical joint 91 are part of a parallel actuating branch that is connected to the motion guiding device 1000, 5000 between the active and passive components of said motion guiding device to contribute to the action of the passive components (e.g. passive rotary joint 77). The axes of rotation 92 and 95 of the actuators 75 and 79, respectively, as well as the axis of rotation 93 of the joint 77 passes through a center of rotation 90 that is aligned (approximately) with the center of rotation of the target joint.

Figure 8:
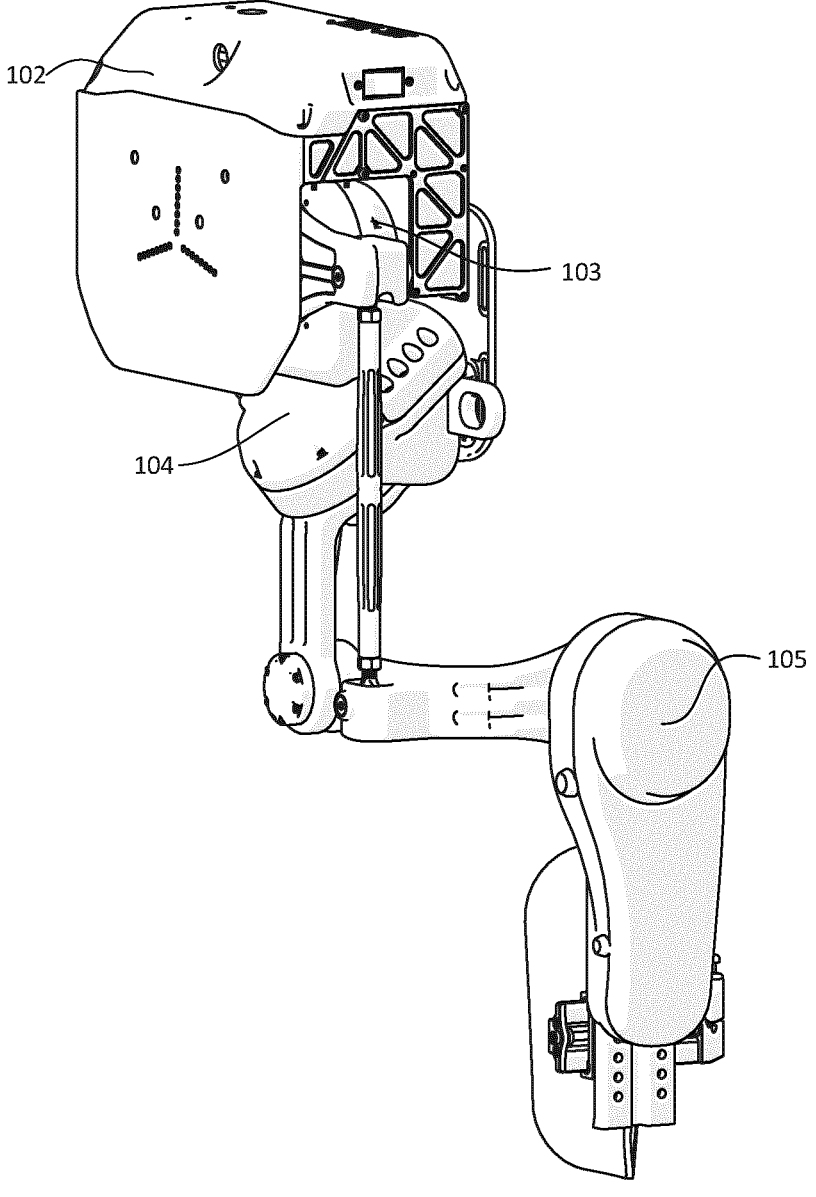
FIG. 8 is a perspective view of a motion guiding device of FIG. 7 showing a backpack unit connected to a base.

FIG. 8 illustrates an embodiment of the device 9000 which further comprises a "backpack" unit 102 that can be rigidly connected to the base 73. The backpack 102 is positioned such that it does not interfere with the various components of the device 9000 and can contain components of the device 9000, such as the controller 95, elements of the user interface 99 as well as any other additional system, such as a battery. The device 9000 can also include covers 103, 104 and 105 to cover the actuators 85, 75, and 79 respectively to prevent interference with the system components from the environment.

Figure 9:
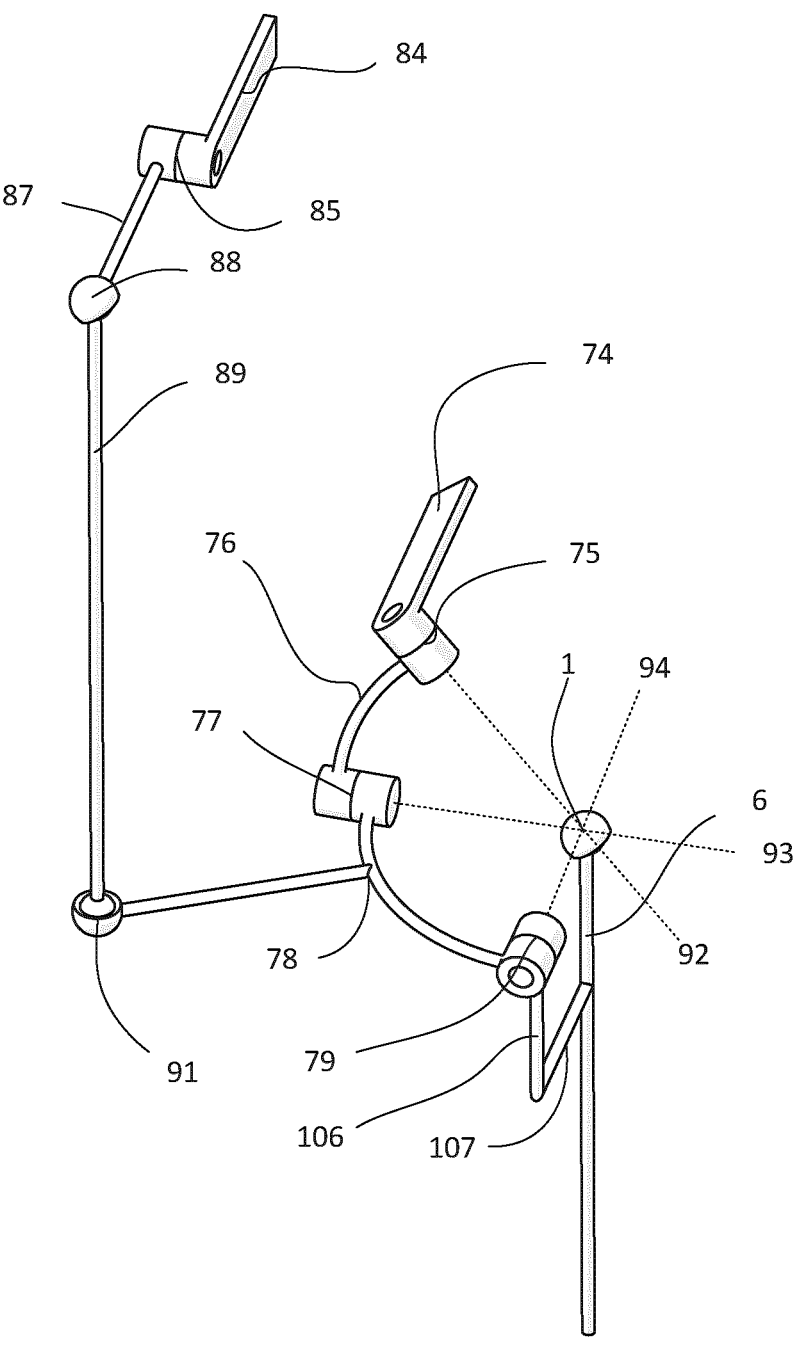
FIG. 9 is a mechanical schematic view showing a structure of the motion guiding device of FIG. 7.

FIG. 9 shows a schematic drawing of the device 9000 to more clearly illustrate the structure of the device. The linkages 74 and 84 are both attached to the base 73, which is not shown for clarity. The linkages 80 and 81 in FIG. 7 are represented with a connection 106 while a connection 107 represents both the adjustable linkage 82 and the orthotic system 83. The connection 107 attaches to the lower leg 6. As shown here, the axes 92, 94 and 93 of the actuators 75, 79 and joint 77 intersect at a point that approximately aligns with the average human hip (target joint) center 1.

A person skilled in the art would understand that one of the spherical joints 88 or 91 could be replaced by any other system which facilitates three DOFs of rotary motion while maintaining the functionality of the mechanism and that such an embodiment is within the scope of this application. One of the spherical joints 88 or 91 could be replaced with an appropriately oriented universal joint while maintaining the functionality of the mechanism. A person skilled in the art could understand that the specific geometry of the linkages (including the linkages 84, 87, 89 and 78) could be altered depending on the motions to be targeted (and the actuator responses that are desired) and that any such alternative geometries are also within the scope of this application. The position and orientation of the actuator 85, which is attached to the base 73 via the linkage 84, could be altered resulting in a corresponding change to the linkage 84. In the illustrated embodiment of the device 9000, the actuator 75 and the actuator 85 primarily actuate the internal/external rotation and abduction/adduction motions of the user's hip while the actuator 79 primarily actuates the flexion motion. However, a person skilled in the art could also see that, through repositioning of the various joints/actuators/linkages/components within the system, the actions of the various actuators could be made to participate to a greater or lesser degree (relative to the embodiment shown in FIG. 9) in any of the biological hip motions. In certain configurations where the actuator 85 can be repositioned such that its axis of rotation intersects the center of rotation 90, it may be feasible to replace the spherical joints 88 and 91 with rotary joints that each have an axis of rotation that intersects the center 90. In various embodiments, this principle can apply to other similar mechanisms where relevant.

In the case that the device 9000 is used as an augmentation device for an individual who possesses some degree of muscle control, the device may instead be semi-active, and one or two of the actuators 75, 79 or actuator 85 that correspond to any degrees of freedom that do not require assistance can be removed and replaced with a passive joint. Optionally, for the semi-active case, a sensor group can then be added to this passive joint to monitor the motion of that joint. The device may be powered by an on-board battery or any other power source. Additionally, a person skilled in the art would understand that any of the previously described structures that provide three DOFs of rotation approximately coinciding at the center of rotation 1, without causing mechanical interference with the user during the target motions, could be used as an underlying configuration of the device 9000. A person skilled in the art would understand that alternative embodiments of the device 9000 can apply to other biological three DOF rotary joints provided that the underlying configuration of these embodiments allows the device to provide three DOFs of rotation about a center of rotation that can be (approximately) aligned with the center of rotation of the target joint and does not cause mechanical interference with the body of the user about that joint (for the target motions) and that all such embodiments and uses are also within the scope of this application.

Figure 10:
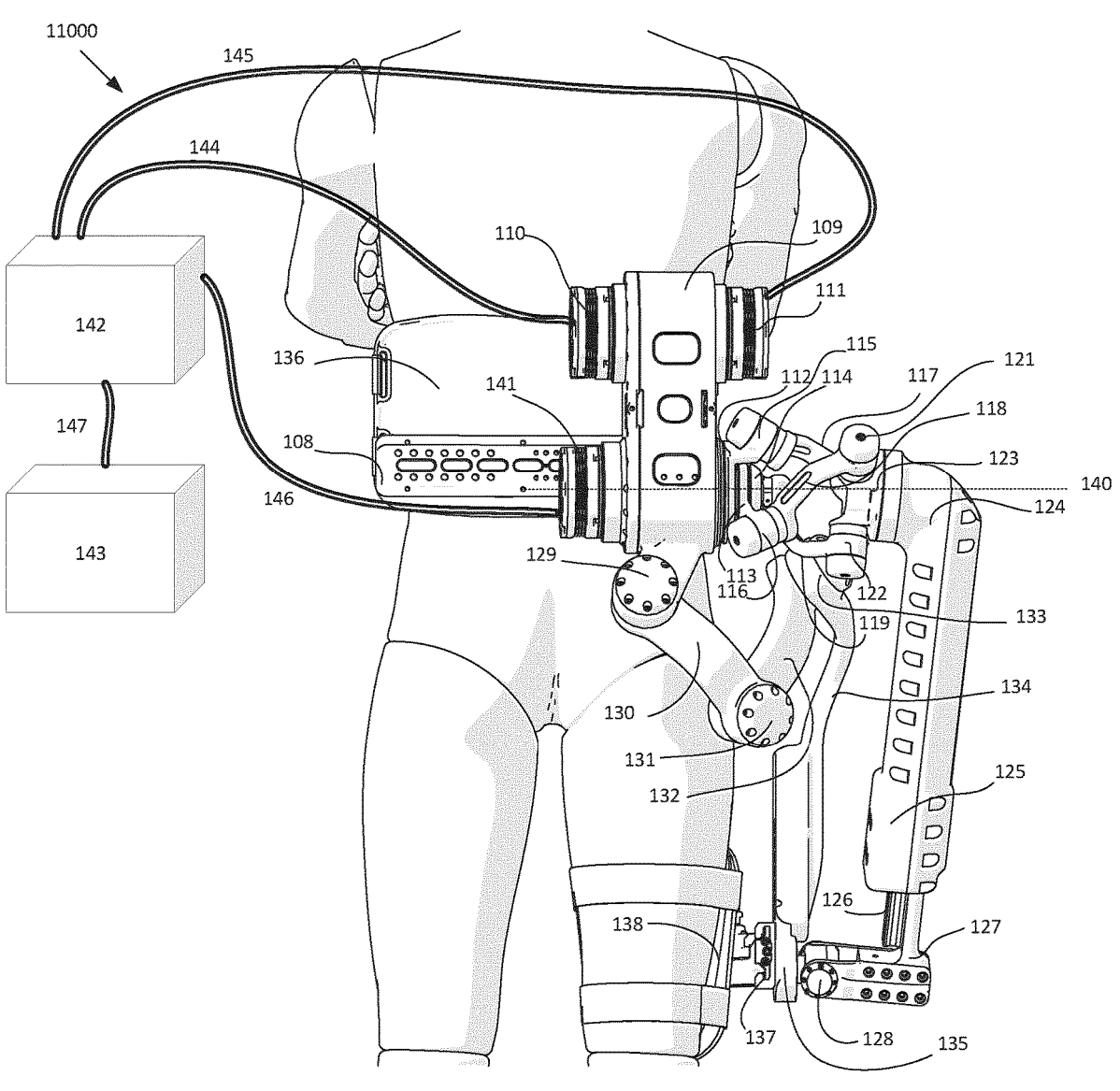
FIG. 10 shows an example of an embodiment of a motion guiding device mounted to a user and viewed from a back of the user.

FIG. 10 illustrates a device 11000 for guiding the motion of a user's target joint employing an embodiment of the motion guiding device 1000 previously described herein. Person skilled in the art would understand that any of the embodiments of motion guiding device previously described herein or any combination thereof can be included in the device 11000 without departing from the scope of the invention. The motion guiding device comprises a base 108, a rotary joint 129, a linkage 130 that is connected to a linkage 132 via rotary joint 131, which is then connected to a linkage 134 via rotary joint 133. The linkage 134 then connects to an effector plate 135 in such a way that the point of connection between the two components is adjustable. The axes of rotation of the rotary joints 129, 131 and 133 intersect at a center of rotation which is approximately aligned with the center of rotation of the target joint (e.g. hip joint 1 of FIG. 1) of the user. The device 11000 can further comprise a motion generator and a motion transfer system similar to the motion generator and the motion transfer system described in the co-pending application PCT/CA2019/050640 (Publication number WO2019/218056) incorporated herein by reference. The motion generator and the motion transfer system are part of the parallel branch for actuating the motion guiding device. The motion generator comprises three actuators 110, 111 and 141 that are connected to the base 108 via a casing 109. The actuator 141 has an axis of rotation that is coincident with an axis 140 and is connected to a rotating shaft. The actuators 110 and 111 are connected via a belt system to the rotating shafts that are contained within the casing 109 and also have axes of rotation coincident with the axis 140. As such, each of the actuators 110, 111 and 141, either by direct connection or through the belt mechanism, drives one of three coaxial shafts that each have an axis of rotation that is coincident with the axis 140. The outputs of the shafts connected to the actuators 110, 111 and 141 are connected to linkages 112, 113 and 114, respectively. The linkages 112, 113 and 114 are connected to the linkages 117, 118 and 119 via rotary joints 115, 116 and 139, respectively. The linkages 117, 118 and 119 via the rotary joints 120, 121 and 122, respectively, are connected to an effector 123. Please note that the components 120 and 139 are obscured in this illustration and are shown instead in FIG. 11. Thus, the components 110, 111, 141, 112, 139, 113, 114, 115, 116, 117, 118, 119, 120, 121, 122, 123 and the components contained within the casing 109 (i.e., the belt mechanism and the rotary shafts) comprise the motion generator of the device 11000. The motion transfer system comprises a cassette 125 which is connected to the effector 123 of the motion generator via a linkage 124. Please note that the cassette 125 can be contained within the linkage 124. A rail 126 is interfaced with the cassette 125 such that the rail 126 can move with one degree of translational motion relative to the cassette 125 forming a linear motion joint. The rail 126 is connected to a universal joint 21 via a linkage set 127. The universal joint 128 is made up of two 1-DOF rotary joints that each have axes of rotation perpendicular to the other. The universal joint 128 then connects to the effector plate 135 of the motion guiding device 1000 described herein above. The casing 109 connects to the linkage 130 via the rotary joint 129. The base 108 is connected to the torso of the user via an orthotic system 136, and the effector plate 135 is connected to the thigh of the user via an orthotic system 138 and an adjustable linkage 137. Thus, the components 124, 125, 126, 127, 128 comprise the motion transfer system, the components 129, 130, 131, 132, 133, 134, 135 comprise the motion guiding device or load bearing system and the components 137, 138 comprise a target body interfacing system. In comparison with the load bearing systems disclosed in the co-pending application PCT/CA2019/050640(Publication number WO2019/218056), the motion guiding devices 1000, 5000 of the present invention can be used as a load bearing system without requiring the use of curvilinear joints. The motion generator in this embodiment of the device 11000 comprises a coaxial spherical manipulator, where the coaxial nature of the device can provide certain advantages regarding certain properties such as the range of motion of the device.

Each of the actuators 110, 111 and 141 of the motion generator is in communication with an output unit of a control system 142 via connections 144, 145 and 146, respectively. Additionally, the actuators each have a sensor group that connects to the control system 142 for obtaining actuator feedback. The control system 142 connects to a user interface system 143 via the connection 147, so that based on the commands given by the user via the user interface system 143, the control system 142 directs the actuators 110, 111 and 141 to perform particular motions with feedback yielded by the appropriate sensor groups. The device 11000 allows for three-DOF positioning of the user's target joint and is load-bearing, as certain forces applied at one point of the device can be transferred to another point on the device without necessarily transferring through the body of the user.

Figure 11:
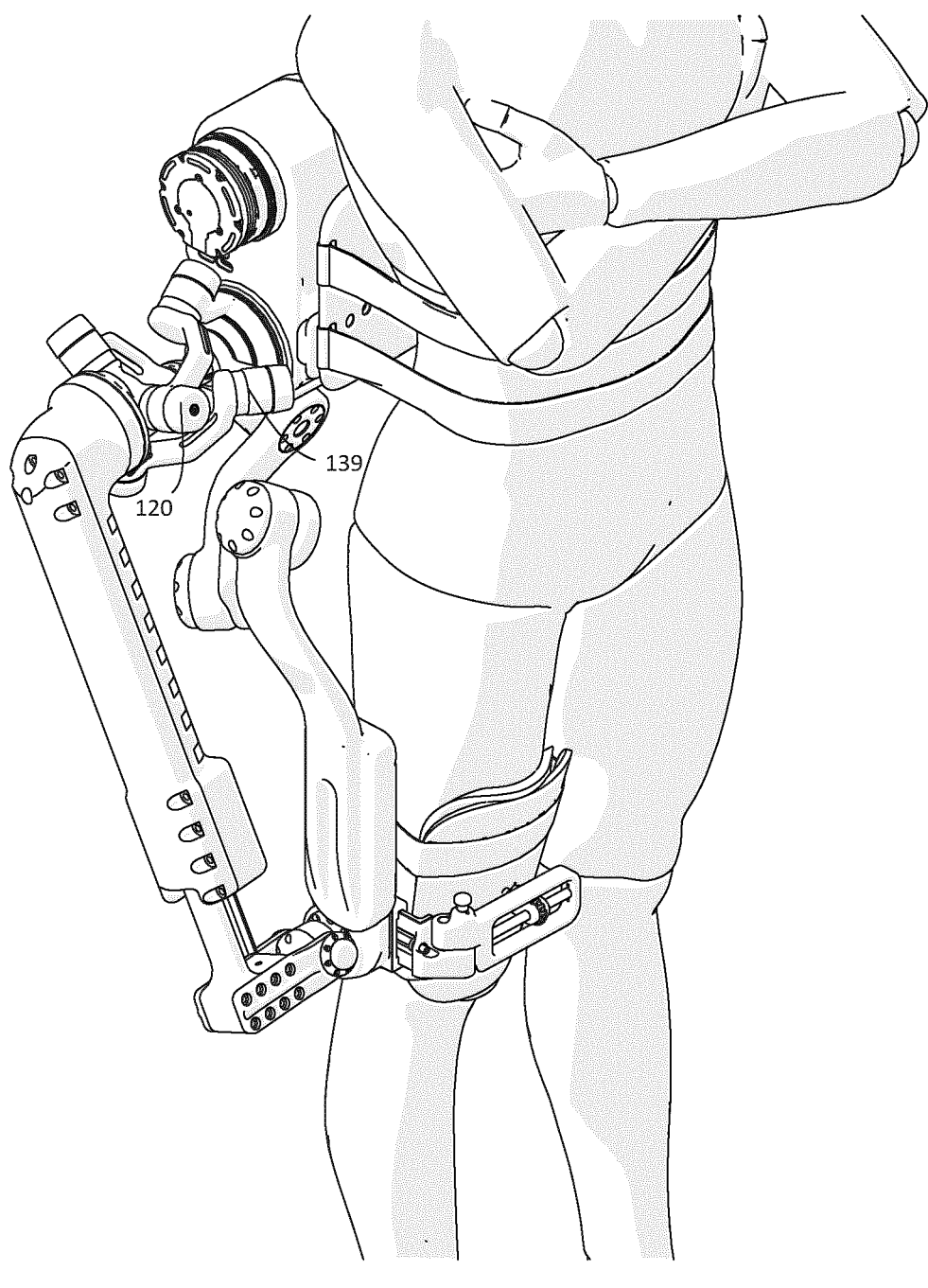
FIG. 11 is perspective view of the motion guiding device of FIG. 10 showing a front and right side of the user.

FIG. 11 shows another view of the device 11000. A person skilled in the art would understand that instead of the linkage 124 connecting to the cassette 125, which interfaces to the rail 126 that connects to the linkage 127, the linkage 124 could connect to the rail 126 which interfaces with the cassette 125 that in turn connects to the linkage 127. That is, the ordering of the rail 126 and the cassette 125 could be exchanged while maintaining the function of the cassette 125 and the rail 126 as a linear joint. Any other method of actuating the three coaxial shafts could be used in place of the timing belt system (such as employing hollow shaft actuators that directly connect to each shaft without employing a timing belt) and all such embodiments are within the scope of this application. In the case that the device 11000 is used as an augmentation system for an individual who possesses some degree of muscle control, the system may instead be semi-active and one or two of the actuators 110, 111 or 141 that correspond to any degrees of freedom that do not require assistance can be removed and replaced with a passive joint. Optionally, for the semi-active case, a sensor group can then be added to this passive joint to monitor the motion of that joint.

Figure 12:
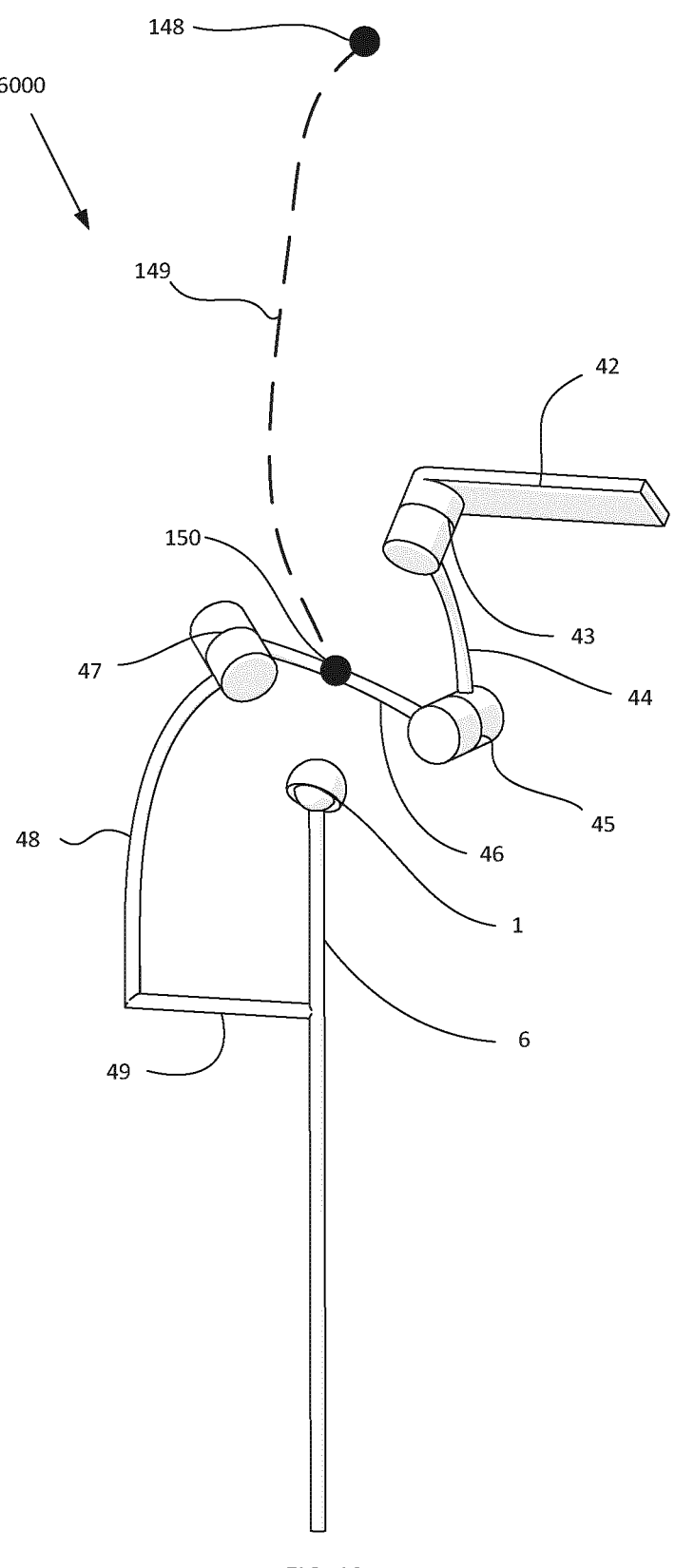
FIG. 12 is a mechanical schematic view of a structure of an embodiment of a motion guiding device with a parallel branch actuation system connected to a linkage of the motion guiding device on one end and a base structure on the opposite end and is configured to indirectly actuate the motion guiding device.

FIGS. 12 to 22 schematically illustrate various schemes/mechanisms of a motion guiding device of the present invention. FIG. 12 illustrates a motion guiding device 6000 with a general scheme of a motion guiding device similar to device 1000, 5000 described herein before, that includes the three rotary joints 43, 45, 47 and system of linkages 42, 44, 46, 48, and 49. The device 6000 further comprises a parallel branch actuator system 149, such as for example the motion generator and motion transfer system of the device 11000 of FIG. 10, that is connected on one side to the base structure of the motion guiding device 6000 at an interface 148 and to the linkage 46 of the motion guiding device 1000, 5000 at an interface 150 on the other side. The system 149 represents any system of linkages, joints and/or components with more than one degree of freedom. Additionally, any of the involved joints may be active according to the required level of actuation at the target joint 1. The positions of the points 148 and 150, the geometry of the system 149, and the dimensions of the various linkages and joints shown in FIG. 12 are for illustration purposes only and are not meant to demonstrate any particular geometric relations other than those stated.

A person skilled in the art would understand that, with respect to device 9000 of FIG. 9, the system 149 comprises the linkage 84 which is connected to the base structure 73 (analogous to 42) at an interface 148. This linkage is then followed by an (active) rotary joint (being the actuator 85) which is subsequently connected to a linkage 87, a spherical joint 88, a linkage 89 and a spherical joint 91. The spherical joint 91 is then connected to the linkage 78 (analogous to 46) via an interface 150. In this case, 149 comprises a 7-DOF system with one active element, with additional active elements at the joints 43 and 47 for 3-DOFs of actuation. In another embodiment, the system 149 may have the same ordering of components as just presented, however, the geometries and position of connection of any of the mentioned joints/linkages/components may be altered and various (possibly different compared with the first embodiment) involved joints may be actuated according to the desired level of actuation.

In another embodiment, the system 149 may comprise a linkage (connected to the base at 148), followed by a spherical joint, followed by a linear joint, followed by a universal joint which is then connected to 46 at 150. In this case, the system 149 is a 6-DOF system where degrees of actuation may be attributed to various joints (such as, for example, the joints 43 and 47 and the linear joint of 149, making it a linear actuator).

In another embodiment, the system 149 may comprise a linkage (connected to the base at 148), followed by a 2-DOF spherical motion system, followed by a linkage, followed by a universal joint, followed by a linkage, followed by a universal joint, which is then connected to the linkage 46 at 150. In this case the system 149 has at least 6-DOFs. Actuation may be applied to various involved joints depending on the level of actuation required (for example, two degrees of actuation can be applied to the 2-DOF spherical motion generator and one degree of actuation can be applied to the joint 47).

Figure 13:
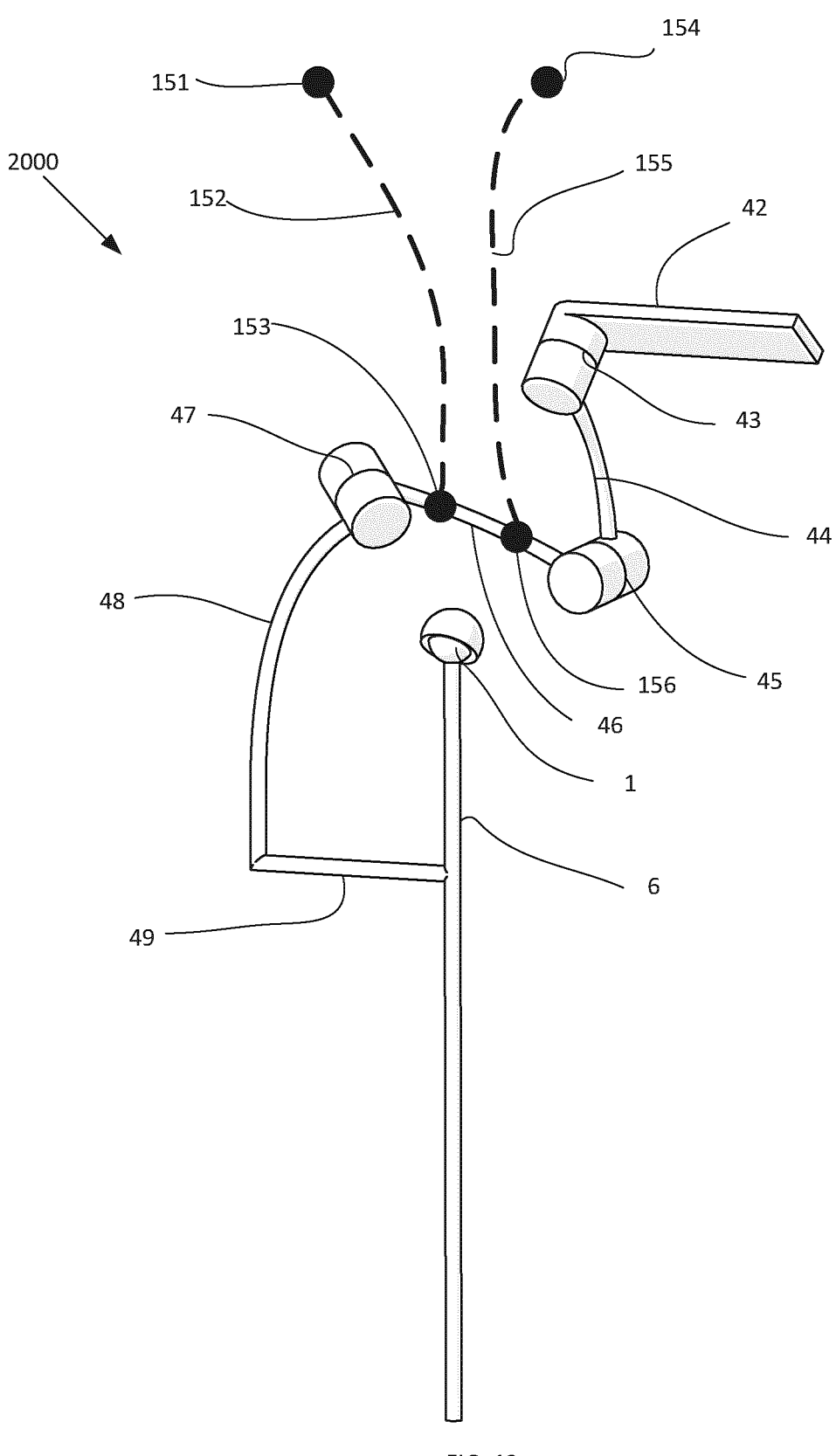
FIG. 13 is a mechanical schematic view of a structure of an embodiment of a motion guiding device with two parallel branch actuation systems used to indirectly actuate the motion guiding device, each of the two parallel branch actuation systems are connected to a linkage of the motion guiding device on one end and a base structure on the opposite end.

FIG. 13 shows schematically a motion guiding device 2000 that is similar to the motion guiding device 6000 of FIG. 12 but includes two parallel branch actuator systems 152 and 155. The first system 152 connects to the linkage 46 at an interface 153 on one side and to the base structure at an interface 151 on the other side. The second system 155 connects to the linkage 46 at an interface 156 on one side and to the base structure at an interface 154 on the other side. The systems 152 and 155 represent any systems of linkages, joints or components with more than one degree of freedom (each). The systems 152 and 155 do not necessarily have the same structure. Additionally, any of the involved joints may be active according to the required level of actuation at the target joint 1. The positions of the points 151, 153, 154 and 156, the form of the systems 152 and 155, and the dimensions of the various linkages and joints shown in this figure are for illustration purposes only and are not meant to demonstrate any particular geometric relations other than those stated.

In one embodiment, the system 152 can comprise a linkage (connected on one side to the base at 151) followed by a spherical joint, followed by a linear joint, followed by a universal joint, which is then connected to 46 at 153. The system 155 can comprise a linkage (connected on one side to the base at 154) followed by a spherical joint, followed by a linear joint, followed by a universal joint, which is then connected to 46 at 156. In such embodiment, both systems 152 and 155 contain 6-DOFs. Actuation may be applied to various joints according to the desired level of actuation (actuation could, for example, be applied to the linear joints of the 152 and 155 systems, making them linear actuators, as well as the rotary joint 43).

In one embodiment, the system 152 can comprise a linkage (connected on one side to the base at 151) followed by a rotary joint, followed by a linkage, followed by a spherical joint, followed by a linkage, followed by a spherical joint, which is connected to the linkage 46 at 153. The system 155 can comprise a linkage (connected on one side to the base at 154) followed by a rotary joint, followed by a linkage, followed by a spherical joint, followed by a linkage, followed by a spherical joint, which is connected to the linkage 46 at 156. Actuation may be applied to various joints according to the desired level of actuation (actuation could, for example, be applied to the rotary joints of the 152 and 155 systems as well as the rotary joint 43).

A person skilled in the art would understand that there are many possible embodiments of the device 2000 other than those presented (employing potentially different linkages, joints, systems or any other component in potentially different orderings and with potentially different geometries or by employing potentially different combinations of joint systems than those presented here) and that all such embodiments are also within the scope of this application. Any examples given are not meant to limit the scope of this disclosure.

Figure 14:
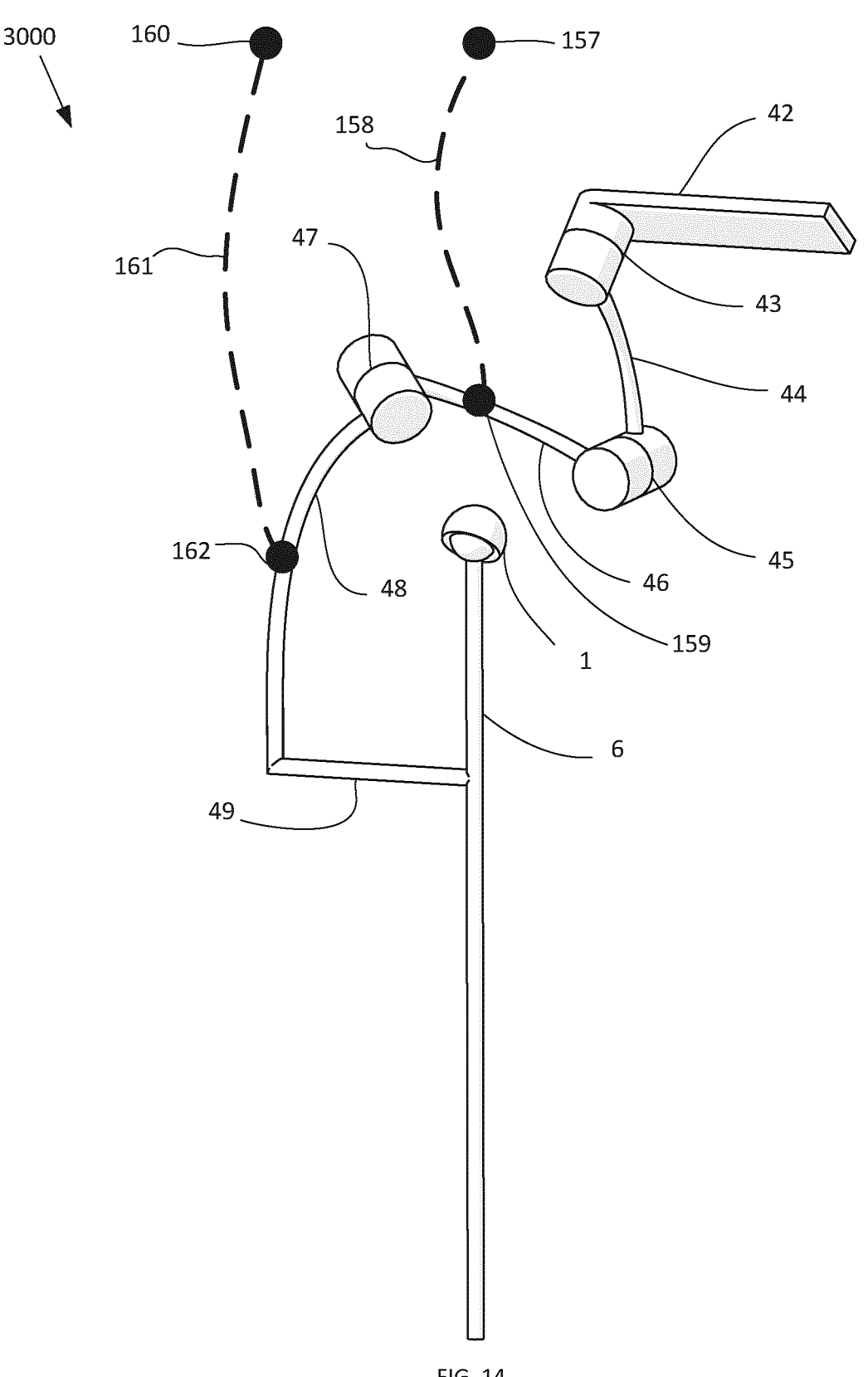
FIG. 14 is a mechanical schematic view of a structure of another embodiment of a motion guiding device with two parallel branch actuation systems, each of the two parallel branch actuation systems are connected to a linkage of the motion guiding device on one end and a base structure on the opposite end.

FIG. 14 schematically illustrates a motion guiding device 3000 which is similar with device 2000 with two parallel branch actuator systems 158 and 161. The first system 158 connects to the linkage 46 at an interface 159 on one side and to the base structure at an interface 157 on the other side. The second system 161 connects to the effector linkage 48 at an interface 162 on one side and to the base structure at an interface 160 on the other side. The systems 158 and 161 represent any systems of linkages, joints or components with more than one degree of freedom (each). The systems 158 and 161 do not necessarily have the same structure. Additionally, any of the involved joints may be active according to the required level of actuation at the target joint 1. The positions of the points 157, 159, 160 and 162, the form of the systems 158 and 161, and the dimensions of the various linkages and joints shown in this figure are for illustration purposes only and are not meant to demonstrate any particular geometric relations other than those stated. In one embodiment, the interface 162 of the system 161 can be positioned on the effector linkage 48 connected to the effector plate or on the effector plate itself.

In one embodiment, the system 158 can consist of a linkage (connected on one side to the base structure at 157), followed by a spherical joint, followed by a linear joint, followed by a universal joint, which connects to the linkage 46 at 159. The system 161 can consist of a linkage (connected on one side to the base structure at 160), followed by a rotary joint, followed by a linkage, followed by a spherical joint, followed by a linkage, followed by another spherical joint, which is connected to the effector linkage 48 at 162. Alternatively, the system 158 may consist of a linkage (connected on one side to the base structure at 157), followed by a rotary joint, followed by a linkage, followed by a spherical joint, followed by a linkage, followed be a spherical joint, which connects to the linkage 46 at 159. Alternatively, the system 161 can consist of a linkage (connected on one side to the base structure at 160), followed by a rotary joint, followed by a linkage. This last linkage is connected to two spherical joints. Each of these two spherical joints is attached to a separate linkage, and each of these linkages is attached to another (separate) spherical joint. Both of these spherical joints attach (the branches rejoin) to one side of a linear motion joint via a single linkage. The other side of this linear motion joint connects to the effector linkage 48 at 162. Actuation may be applied to various joints to achieve the desired level of actuation. For example, the joint 43 might be active, along with the linear motion joint of the system first form of the system 158 and the rotary joint of the first form of the system 161. In the alternative form of 158, the rotary joint might be active and, in the alternative form of 161, the rotary joint might be active, for example. Each of these mentioned systems 158 and 161 may have advantages/disadvantages relative to the other. For example, the alternative form of the system 161 may show superior torque transferring capability in certain situations due to its quadrilateral structure.

A person skilled in the art would understand that there are many possible embodiments of the motion guiding device 3000 other than those presented (employing potentially different linkages, joints, systems or any other component in different potentially orderings and with potentially different geometries or by employing potentially different combinations of joint systems than those here presented) and that all such embodiments are also within the scope of this application. Any examples given are not meant to limit the scope of this disclosure.

Figure 15:
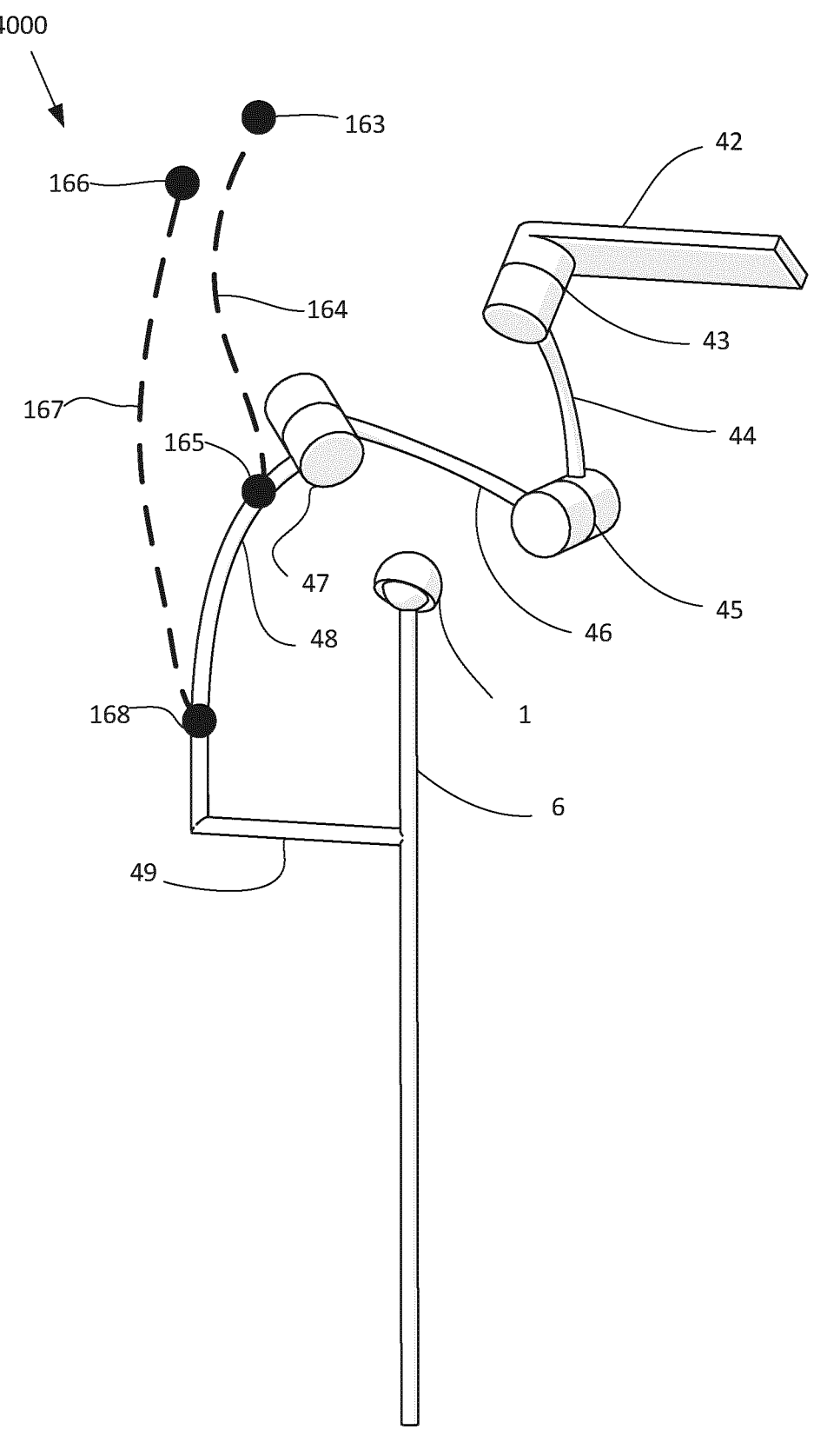
FIG. 15 is a mechanical schematic view of a structure of yet another embodiment of a motion guiding device with two parallel branch actuation systems, each of the two parallel branch actuation systems are connected to a linkage of the motion guiding device on one end and a base structure on the opposite end.

FIG. 15 schematically illustrates a motion guiding device 4000 which is similar to devices 2000, 3000 with two parallel branch actuator systems 164 and 167. The first system 164 connects to the effector linkage 48 (instead of linkage 46) at an interface 165 on one side and to the base structure at an interface 163 on the other side. The second system 167 also connects to the effector linkage 48 at an interface 168 on one side and to the base structure at an interface 166 on the other side. In one embodiment, either (or both) of the interfaces 165 and 168 of the systems 164 and 167 respectively can be positioned on the effector linkage 48 connected to the effector plate or on the effector plate itself. The systems 164 and 167 represent any systems of linkages, joints or components with more than one degree of freedom (each). The systems 164 and 167 do not necessarily have the same structure. Additionally, any of the involved joints may be active according to the required level of actuation at the target joint. The positions of the points 163, 165, 166 and 168, the form of the systems 164 and 167, and the dimensions of the various linkages and joints shown in this figure are for illustration purposes only and are not meant to demonstrate any particular geometric relations other than those stated.

In one embodiment, the system 164 may consist of a linkage (connected on one side to the base structure at 163), followed by a spherical joint, followed by a linear joint, followed by a universal joint, which is connected to the effector linkage 48 at 165. The system 167 may consist of a linkage (connected on one side to the base structure at 166), followed by a spherical joint, followed by a linear joint, followed by a universal joint, which is connected to the effector linkage 48 at 168. Actuation may be applied to various joints according to the desired level of actuation (for example, actuation may be applied to the linear motion joint of 164, the linear motion joint of 167 and the joint 43).

In one embodiment, the system 164 may consist of a linkage (connected on one side to the base structure at 163), followed by a rotary joint, followed by a linkage, followed by a spherical joint, followed by a linkage, followed by a spherical joint which is connected to the effector linkage 48 at 165. The system 167 may consist of a linkage (connected on one side to the base structure at 166), followed by a rotary joint, followed by a linkage, followed by a spherical joint, followed by a linkage, followed by a spherical joint, which is connected to the effector linkage 48 at 168. Actuation may be applied to various joints (for example, actuation could be applied to the rotary joint of 164, the rotary joint of 167 and the joint 43). A person skilled in the art would understand that if the rotary joints of 164 and 167 were to be positioned such that their axes of rotation intersect the hip center, the spherical joints of 164 and 167 could possibly be replaced with rotary joints that also have axes of rotation that intersect the hip center.

Figure 16:
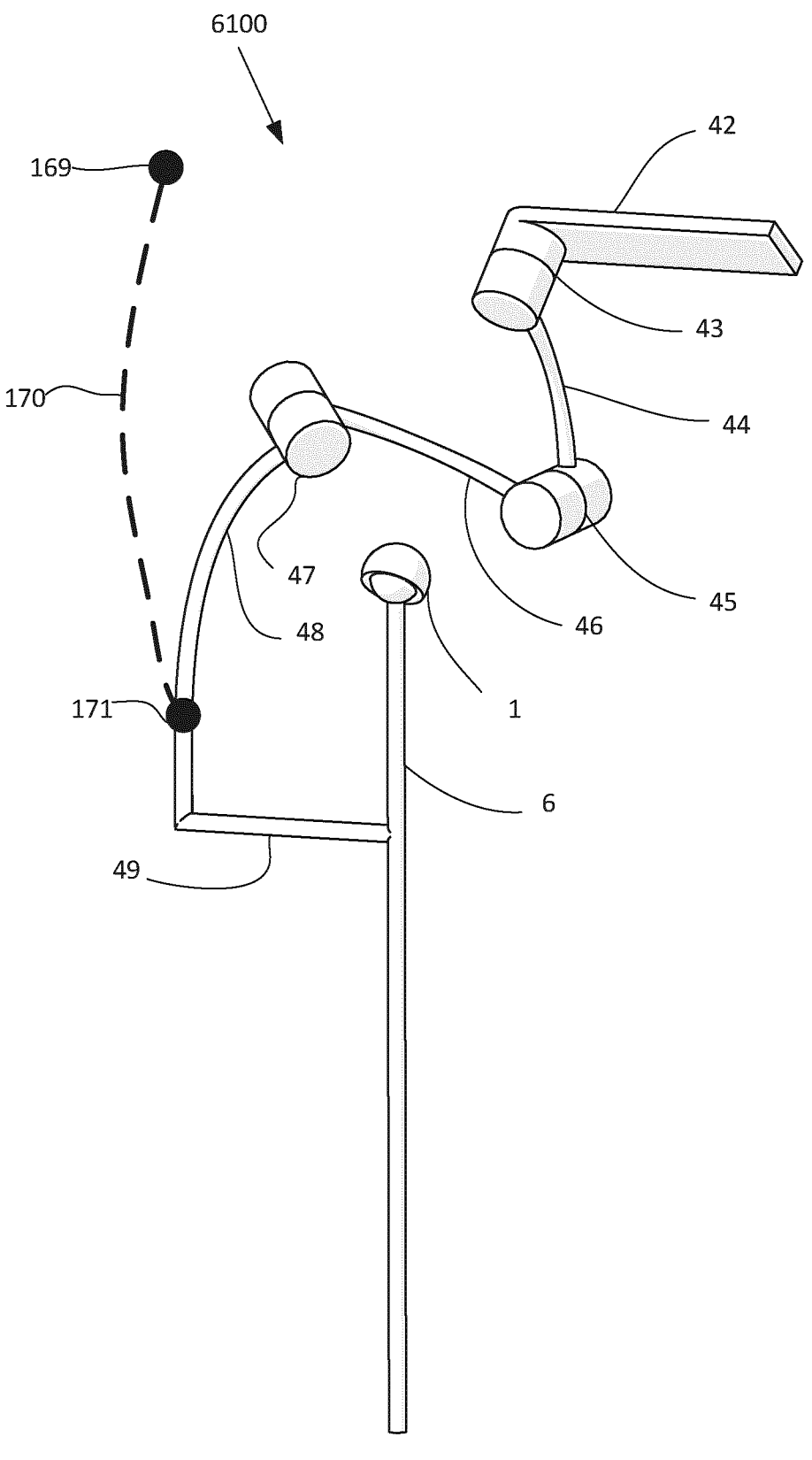
FIG. 16 is a mechanical schematic view of a structure of another embodiment of a motion guiding device with one parallel branch actuation system connected to a linkage of the motion guiding device on one end and a base structure on the opposite end.

FIG. 16 schematically illustrates a motion guiding device 6100 which is similar to device 6000 with one parallel branch actuator system 170 which connects to the effector linkage 48 (instead of to the linkage 46) at an interface 171 on one side and to the base structure at an interface 169 on the other side. In one embodiment, the interface 171 of the system 170 can be positioned on the effector linkage 48 connected to the effector plate or on the effector plate itself. The system 170 represents any system of linkages, joints or components with more than one degree of freedom. Additionally, any of the involved joints may be active according to the required level of actuation at the target joint. The positions of the points 169 and 171 of the system 170, and the dimensions of the various linkages and joints shown in this figure are for illustration purposes only and are not meant to demonstrate any particular geometric relations other than those stated.

In one embodiment, the system 170 may consist of a linkage (connected on one side to the base structure at 169), followed by a rotary joint, followed by a linkage, followed by a spherical joint, followed by a linkage, followed by a spherical joint which is connected to the effector linkage 48 at 171. Actuation may be applied to various joints (for example, actuation could be applied to the rotary joint of 170, the rotary joint 47 and the joint 43). A person skilled in the art would understand that if the rotary joint of 170 were to be positioned such that its axes of rotation intersects the hip center, the spherical joints of 170 could possibly be replaced with rotary joints that also have axes of rotation that intersect the hip center.

A person skilled in the art could understand that the device 6100 is similar with the device 11000 of FIG. 10 where system 170 can consist of the components 110-128, 139. The components 108, 109, 129-137 are analogous to the components 42-48 of the device 6100. In this case, the joints 112, 113 and 114 (see FIG. 10) are active (being actuated by actuators 109, 110 and 141). In another embodiment, the system 170 may have the same ordering of components as just presented. However, the geometries and position of connection of any of the mentioned joints/linkages/components may be altered, and various (possibly different compared with the first embodiment) involved joints may be actuated according to the desired level of actuation.

A person skilled in the art would understand that there are many possible embodiments of the device 6100 other than those presented (employing potentially different linkages, joints, systems or any other component in different potentially orderings and with potentially different geometries, or by employing potentially different combinations of joint systems than those here presented) and that all such embodiments are also within the scope of this application. Any examples given are not meant to limit the scope of this disclosure.

Figure 17:
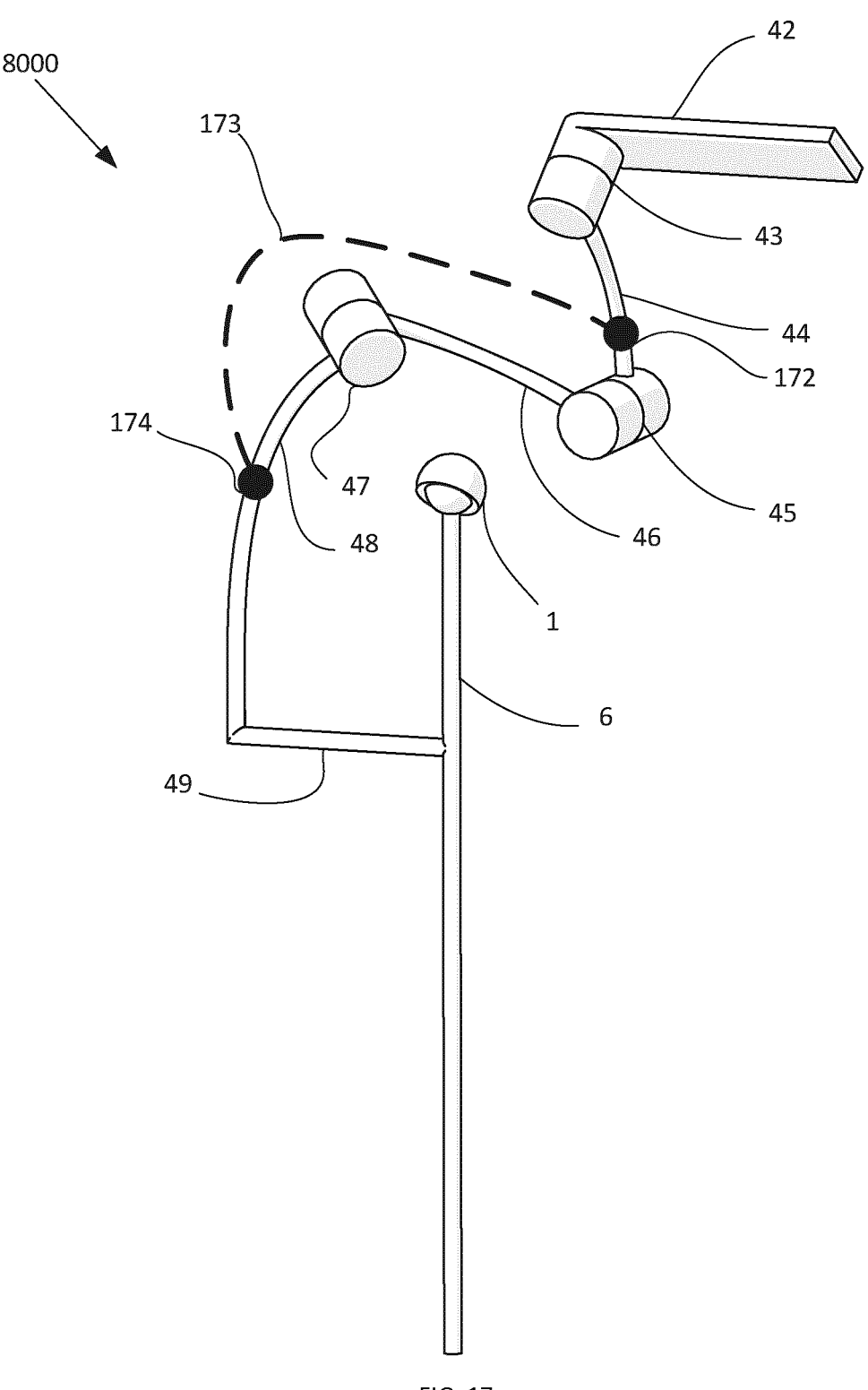
FIG. 17 is a mechanical schematic view of a structure of another embodiment of a motion guiding device with one parallel branch actuation system connected to a linkage of the motion guiding device on one end and another linkage of the motion guiding device on the opposite end.

FIG. 17 schematically illustrates another embodiment of a motion guiding device 8000 with one parallel branch actuator system 173. The system 173 connects to the effector linkage 48 at an interface 174 on one side and to the linkage 44 (instead of the base structure) at an interface 172 on the other side. In one embodiment, the interface 174 of the system 173 can be positioned on the effector linkage 48 connected to the effector plate or on the effector plate itself. The system 173 represents any system of linkages, joints or components with at least one degree of freedom. Additionally, any of the involved joints may be active according to the required level of actuation at the target joint. The positions of the points 172 and 174, the form of the system 173, and the dimensions of the various linkages and joints shown herein are for illustration purposes only and are not meant to demonstrate any particular geometric relations other than those stated.

In one embodiment, the system 173 may include a linkage (connected on one side to the linkage 44 at 172), followed by a 2-DOF spherical manipulator, followed by a linkage, followed by a universal joint, followed by a linkage, followed by a universal joint that connects to the effector linkage 48 at 174. Actuation may be applied to various joints (for example, actuation may be applied to both degrees of the 2-DOF spherical manipulator and may also be applied to the joint 43).

A person skilled in the art would understand that there are many possible embodiments of the device 8000 other than those presented (employing potentially different linkages, joints, systems or any other component in potentially different orderings and with potentially different geometries or by employing potentially different combinations of joint systems than those presented here) and that all such embodiments are also within the scope of this application. Any examples given are not meant to limit the scope of this disclosure.

Figure 18:
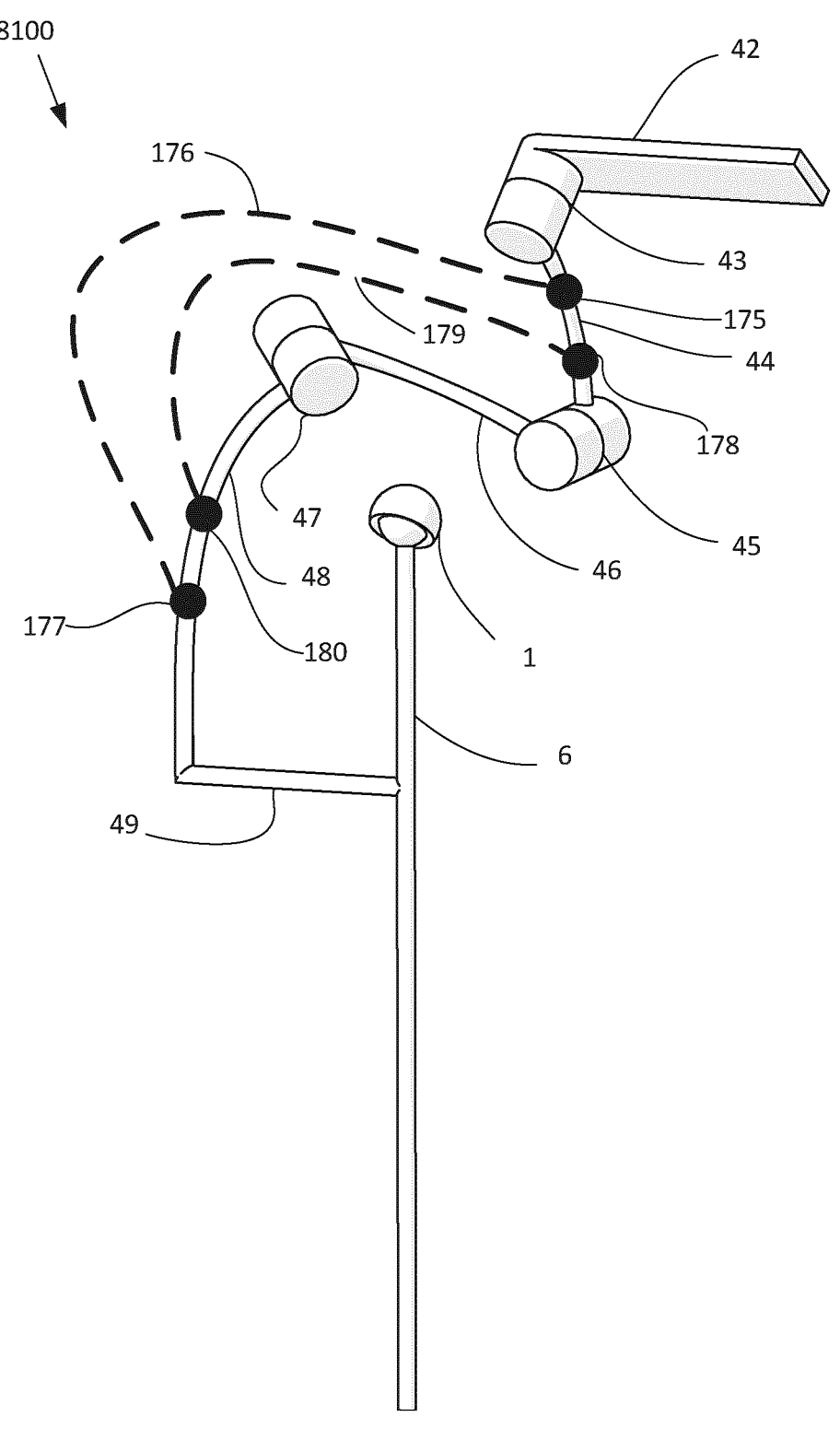
FIG. 18 is a mechanical schematic view of a structure of another embodiment of a motion guiding device with two parallel branch actuation systems, each of the two parallel branch actuation systems are connected to a linkage of the motion guiding device on one end and another linkage of the motion guiding device on the opposite end.

FIG. 18 schematically illustrates a motion guiding device 8100 similar to device 8000 of FIG. 17, but employing two (instead of one) parallel branch actuator systems 176 and 179. The first system 176 connects to the effector linkage 48 at an interface 177 on one side and to the linkage 44 at an interface 175 on the other side. The second system 179 connects to the effector linkage 48 at an interface 180 on one side and to the linkage 44 at an interface 178 on the other side. In one embodiment, either (or both) of the interfaces 177 and 180 of the systems 176 and 179 respectively can be positioned on the effector linkage 48 connected to the effector plate or on the effector plate itself. The systems 176 and 179 represent any systems of linkages, joints or components with at least one degree of freedom (each). The systems 176 and 179 do not necessarily have the same structure. Additionally, any of the involved joints may be active according to the required level of actuation at the target joint. The positions of the points 175, 177, 178 and 180, the form of the systems 176 and 179, and the dimensions of the various linkages and joints shown in this figure are for illustration purposes only and are not meant to demonstrate any particular geometric relations other than those stated.

In one embodiment, the system 176 may consist of a linkage (connected to the linkage 44 at 175), followed by a spherical joint, followed by a linear joint, followed by a universal joint, which connects to the effector linkage 48 at 177. The system 179 may consist of a linkage (connected to the linkage 44 at 178), followed by a spherical joint, followed by a linear joint, followed by a universal joint, which connects to the effector linkage 48 at 180. Actuation may be applied to various joints according to the desired level of actuation (for example, actuation may be applied to the linear motion joint of 176, the linear motion joint of 179 and the joint 43).

In one embodiment, the system 176 may consist of a linkage (connected to the linkage 44 at 175), followed by a rotary joint, followed by a linkage, followed by a spherical joint, followed by a linkage, followed by another spherical, which connects to the effector linkage 48 at 177. The system 179 may consist of a linkage (connected to the linkage 44 at 178), followed by a rotary joint, followed by a linkage, followed by a spherical joint, followed by a linkage, followed by another spherical, which connects to the effector linkage 48 at 180. Actuation may be applied to various joints according to the desired level of actuation (for example, actuation may be applied to the rotary joint of 176, the rotary joint of 179 and the joint 43).

A person skilled in the art would understand that there are many possible embodiments of the device 8100 other than those presented (employing potentially different linkages, joints, systems or any other component in potentially different orderings and with potentially different geometries or by employing potentially different combinations of joint systems than those here presented) and that all such embodiments are also within the scope of this application. Any examples given are not meant to limit the scope of this disclosure.

Figure 19:
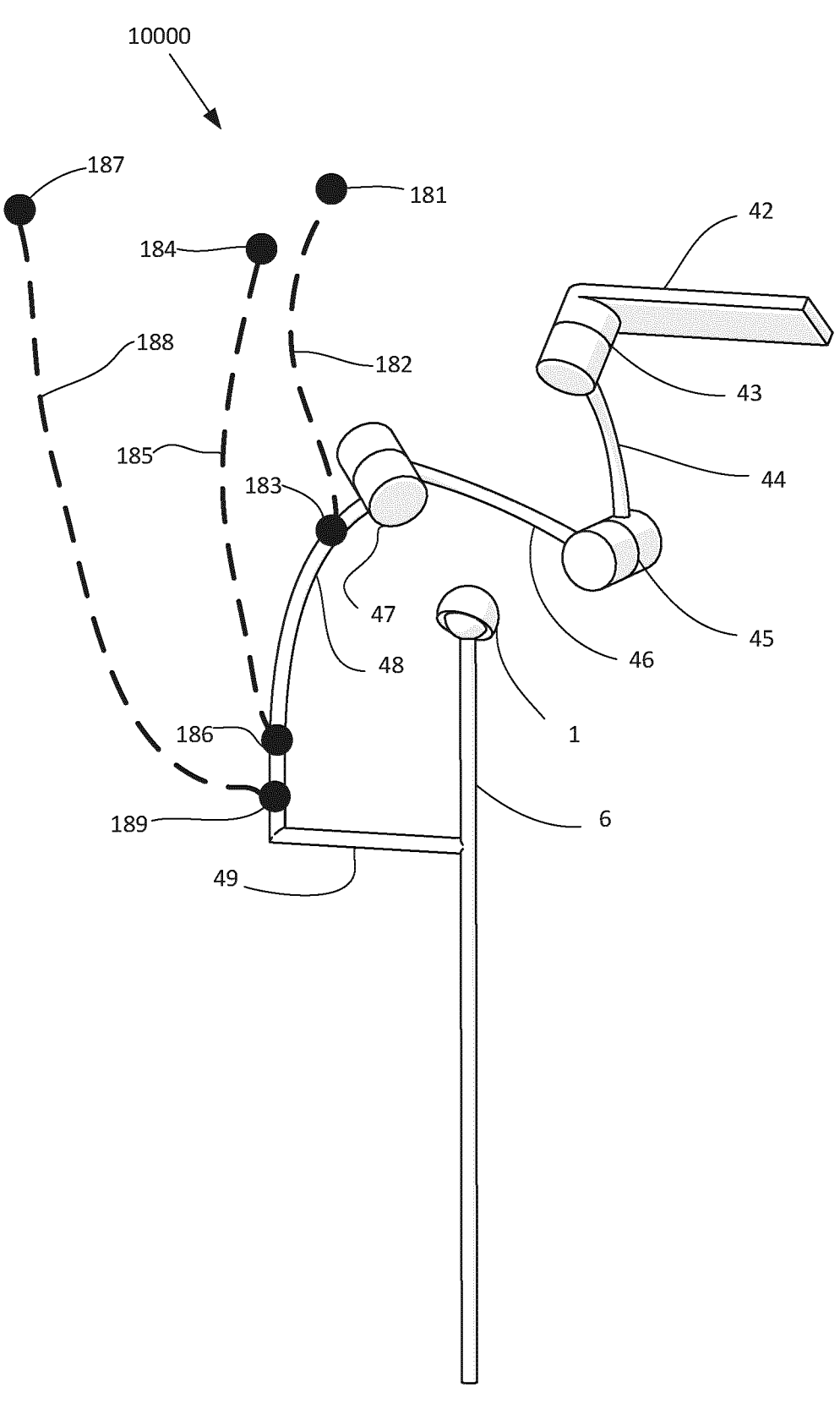
FIG. 19 is a mechanical schematic view of a structure of another embodiment of a motion guiding device with three parallel branch actuation systems, each of the three parallel branch actuation systems are connected to a linkage of the motion guiding device on one end and a base structure on the opposite end.

FIG. 19 schematically illustrates another embodiment of a motion guiding device 10000 with three parallel branch actuator systems 182, 185 and 188. The first system 182 connects to the effector linkage 48 at an interface 183 on one side and to the base structure at an interface 181 on the other side. The second system 185 connects to the effector linkage 48 at an interface 186 on one side and to the base structure at an interface 184 on the other side. The third system 188 connects to the effector linkage 48 at an interface 189 on one side and to the base structure at an interface 187 on the other side. In one embodiment, any (or all) of the interfaces 183, 186 or 189 of the systems 182, 185 or 188 respectively can be positioned on the effector linkage 48 connected to the effector plate or on the effector plate itself. The systems 182, 185 and 188 represent any systems of linkages, joints or components with more than one degree of freedom (each). The systems 182, 185 and 188 do not necessarily have the same structure. Additionally, any of the involved joints may be active according to the required level of actuation at the target joint. The positions of the points 181, 183, 184, 186, 187 and 189, the form of the systems 182, 185 and 188, and the dimensions of the various linkages and joints shown in this figure are for illustration purposes only and are not meant to demonstrate any particular geometric relations other than those stated.

In one embodiment, the system 182 may consist of a linkage (connected on one side to the base structure at 181), followed by a spherical joint, followed by a linear joint, followed by a universal joint, which is connected to the effector linkage 48 at 183. The system 185 may consist of a linkage (connected on one side to the base structure at 184), followed by a spherical joint, followed by a linear joint, followed by a universal joint, which is connected to the effector linkage 48 at 186. The system 188 may consist of a linkage (connected on one side to the base structure at 187), followed by a spherical joint, followed by a linear joint, followed by a universal joint, which is connected to the effector linkage 48 at 189. Actuation may be applied to various joints according to the desired level of actuation (for example, actuation may be applied to the linear motion joint of 182, the linear motion joint of 185 and the linear motion joint of 188). Any examples given are not meant to limit the scope of this disclosure.

Figure 20:
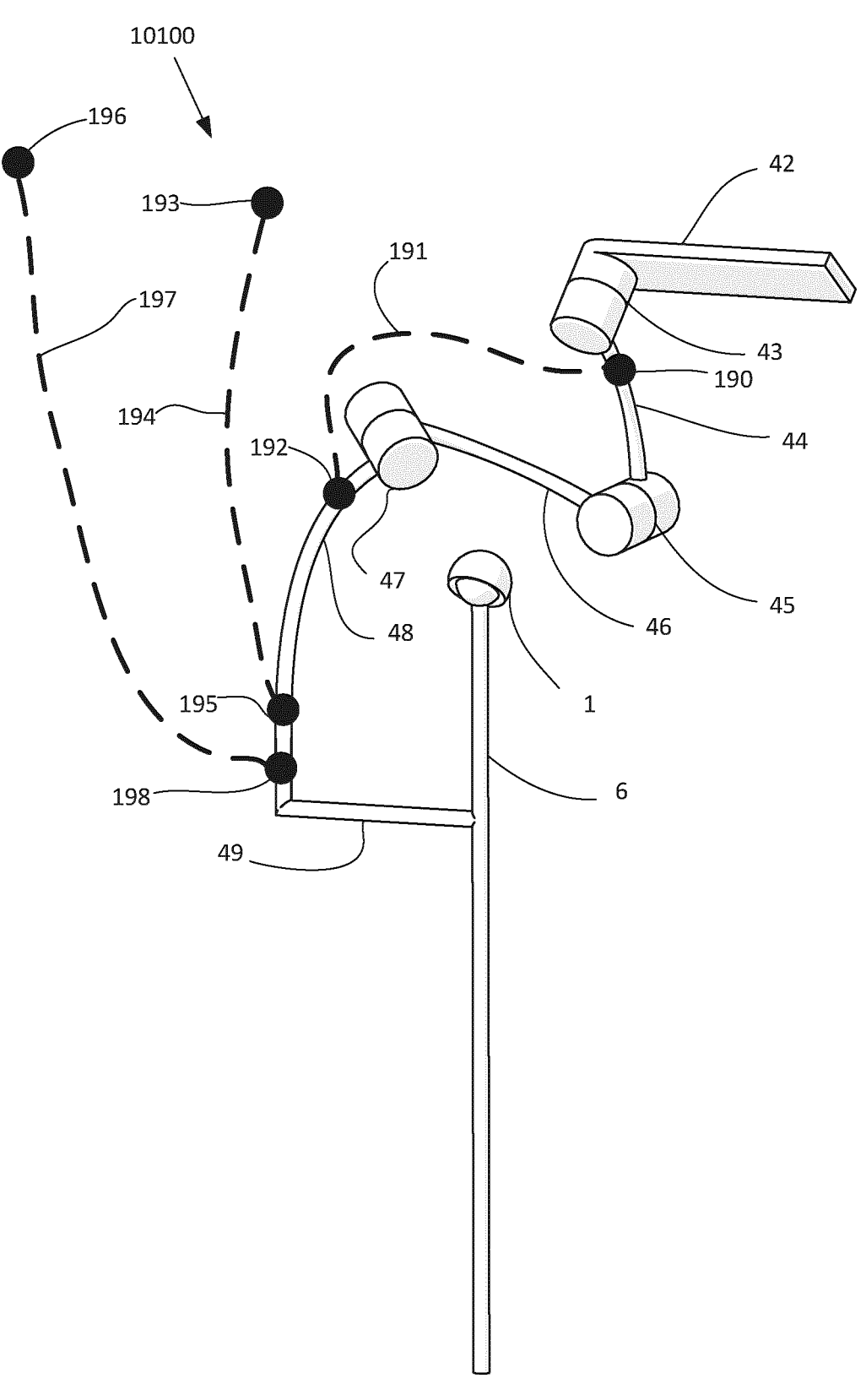
FIG. 20 is a mechanical schematic view of a structure of yet another embodiment of a motion guiding device with three parallel branch actuation systems, two of the three parallel branch actuation systems are connected to a linkage of the motion guiding device on one end and a base structure on the opposite end, and one of the three parallel branch actuation systems is connected to a linkage of the motion guiding device on one end and another linkage of the motion guiding device on the opposite end.

FIG. 20 schematically illustrates a motion guiding device 10100, similar to the device 10000 of FIG. 19, with three parallel branch actuator systems 191, 194 and 197. The first system 191 connects to the effector linkage 48 at an interface 192 on one side and to the linkage 44 (instead of base structure) at an interface 190 on the other side. The second system 194 connects to the effector linkage 48 at an interface 195 on one side and to the base structure at an interface 193 on the other side. The third system 197 connects to the effector linkage 48 at an interface 198 on one side and to the base structure at an interface 196 on the other side. In one embodiment, any (or all) of the interfaces 192, 195 or 198 of the systems 191, 194 or 197 respectively can be positioned on the effector linkage 48 connected to the effector plate or on the effector plate itself. The systems 191, 194 and 197 represent any systems of linkages, joints or components with more than one degree of freedom (each). The systems 191, 194 and 197 do not necessarily have the same structure. Additionally, any of the involved joints may be active according to the required level of actuation at the target joint. The positions of the points 190, 192, 193, 195, 196 and 198, the forms of the systems 191, 194 and 197, and the dimensions of the various linkages and joints shown in this figure are for illustration purposes only and are not meant to demonstrate any particular geometric relations other than those stated. Any examples given are not meant to limit the scope of this disclosure.

Figure 21:
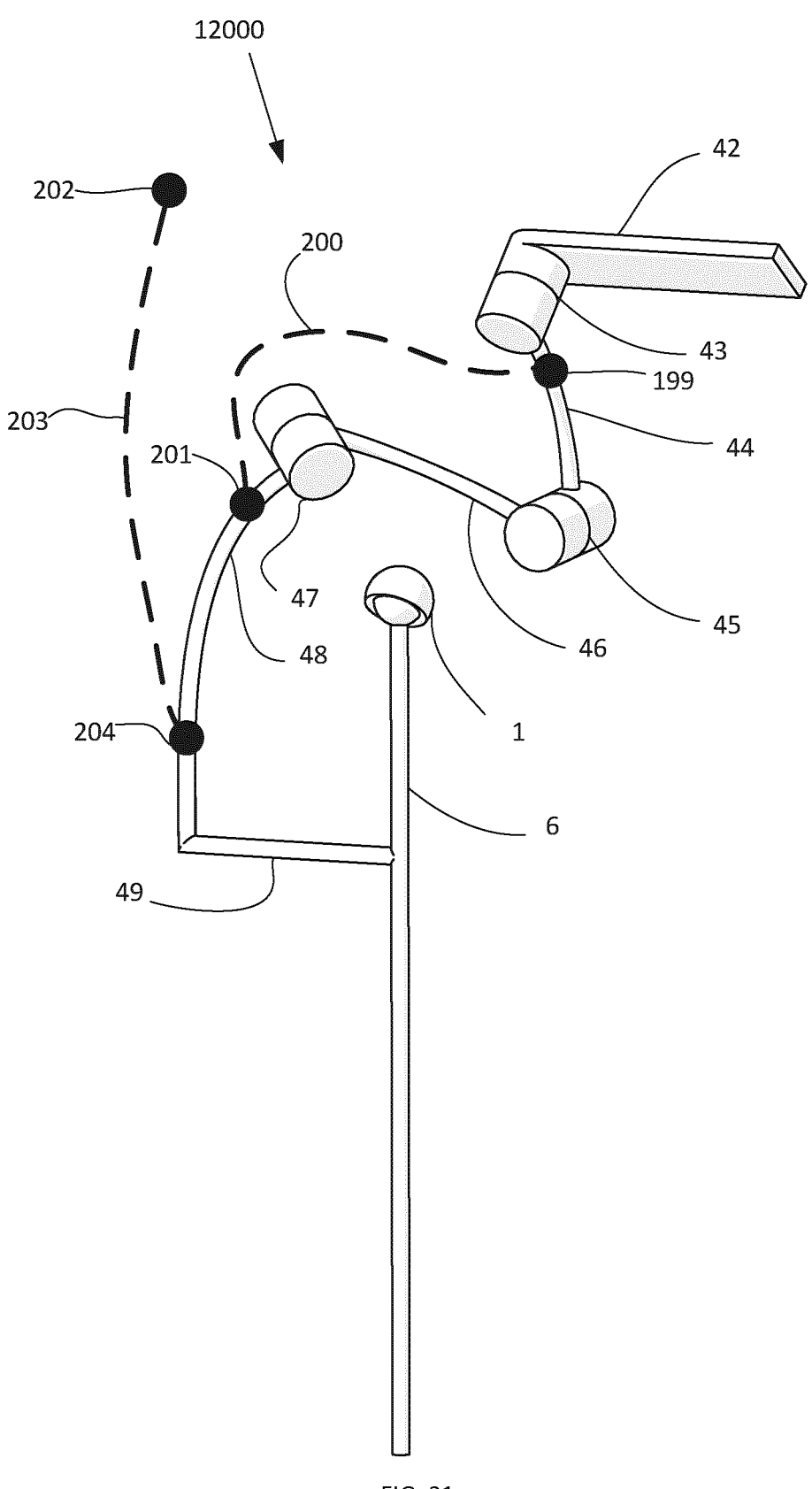
FIG. 21 is a mechanical schematic view of a structure of another embodiment of a motion guiding device with two parallel branch actuation systems, one of the two parallel branch actuation systems is connected to a linkage of the motion guiding device on one end and a base structure on the opposite end, and one of the two parallel branch actuation systems is connected to a linkage of the motion guiding device on one end and another linkage of the motion guiding device on the opposite end.

FIG. 21 schematically illustrates another embodiment of a motion guiding device 12000 with two parallel branch actuator systems 200 and 203. The first system 200 connects to the effector linkage 48 at an interface 201 on one side and to the linkage 44 at an interface 199 on the other side. The second system 203 which connects to the effector linkage 48 at an interface 204 on one side and to the base structure at an interface 202 on the other side. In one embodiment, either (or both) of the interfaces 201 and 204 of the systems 200 and 203 respectively can be positioned on the effector linkage 48 connected to the effector plate or on the effector plate itself. The systems 200 and 203 represent any systems of linkages, joints or components with at least one degree of freedom (each). The systems 200 and 203 do not necessarily have the same structure. Additionally, any of the involved joints may be active according to the required level of actuation at the target joint. The positions of the points 199, 201, 202 and 204, the form of the systems 200 and 203, and the dimensions of the various linkages and joints shown in this figure are for illustration purposes only and are not meant to demonstrate any particular geometric relations other than those stated.

A person skilled in the art would understand that there are many possible embodiments of the device 12000 other than those presented (employing potentially different linkages, joints, systems or any other component in potentially different orderings and with potentially different geometries or by employing potentially different combinations of joint systems than those here presented) and that all such embodiments are also within the scope of this application. Any examples given are not meant to limit the scope of this disclosure.

Figure 22:
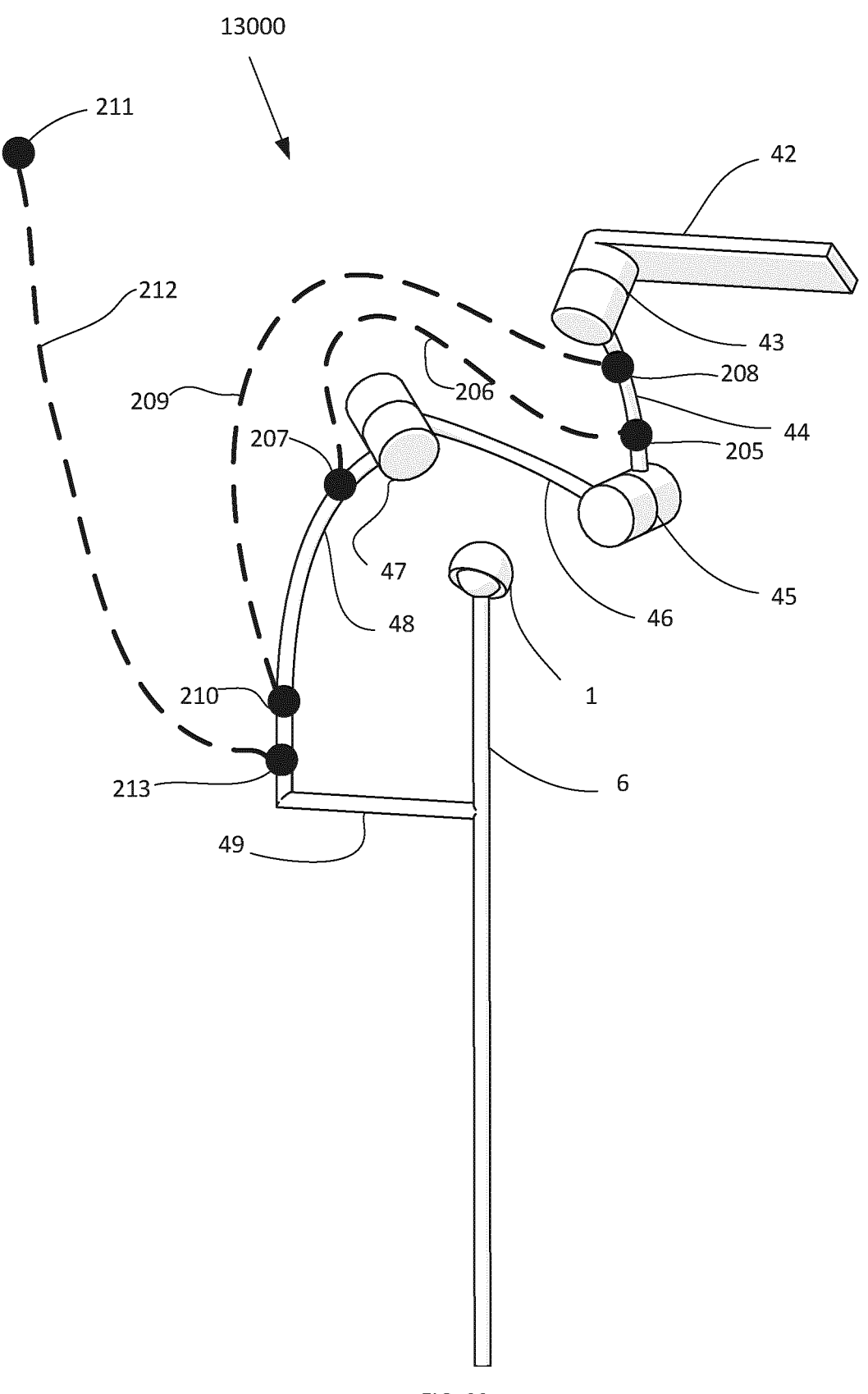
FIG. 22 is a mechanical schematic view of a structure of another embodiment of a motion guiding device with three parallel branch actuation systems, one of the three parallel branch actuation systems is connected to a linkage of the motion guiding device on one end and a base structure on the opposite end, and two of the three parallel branch actuation systems are connected to a linkage of the motion guiding device on one end and another linkage of the motion guiding device on the opposite end.

FIG. 22 schematically illustrates another embodiment of a motion guiding device 13000 with three parallel branch actuator systems 206, 209 and 212. The first system 206 connects to the effector linkage 48 at an interface 207 on one side and to the linkage 44 at an interface 205 on the other side. The second system 209 connects to the effector linkage 48 at an interface 210 on one side and to the linkage 44 at an interface 208 on the other side. The third system 212 connects to the effector linkage 48 at an interface 213 on one side and to the base structure at an interface 211 on the other side. In one embodiment, any (or all) of the interfaces 207, 210 or 213 of the systems 206, 209 or 212 respectively can be positioned on the effector linkage 48 connected to the effector plate or on the effector plate itself. The systems 206, 209 and 212 represent any systems of linkages, joints or components with more than one degree of freedom (each). The systems 206, 209 and 212 do not necessarily have the same structure. Additionally, any of the involved joints may be active according to the required level of actuation at the target joint. The positions of the points 205, 207, 208, 210, 211 and 213, the forms of the systems 206, 209 and 212, and the dimensions of the various linkages and joints shown in this figure are for illustration purposes only and are not meant to demonstrate any particular geometric relations other than those stated. Any examples given are not meant to limit the scope of this disclosure.

Figure 23:
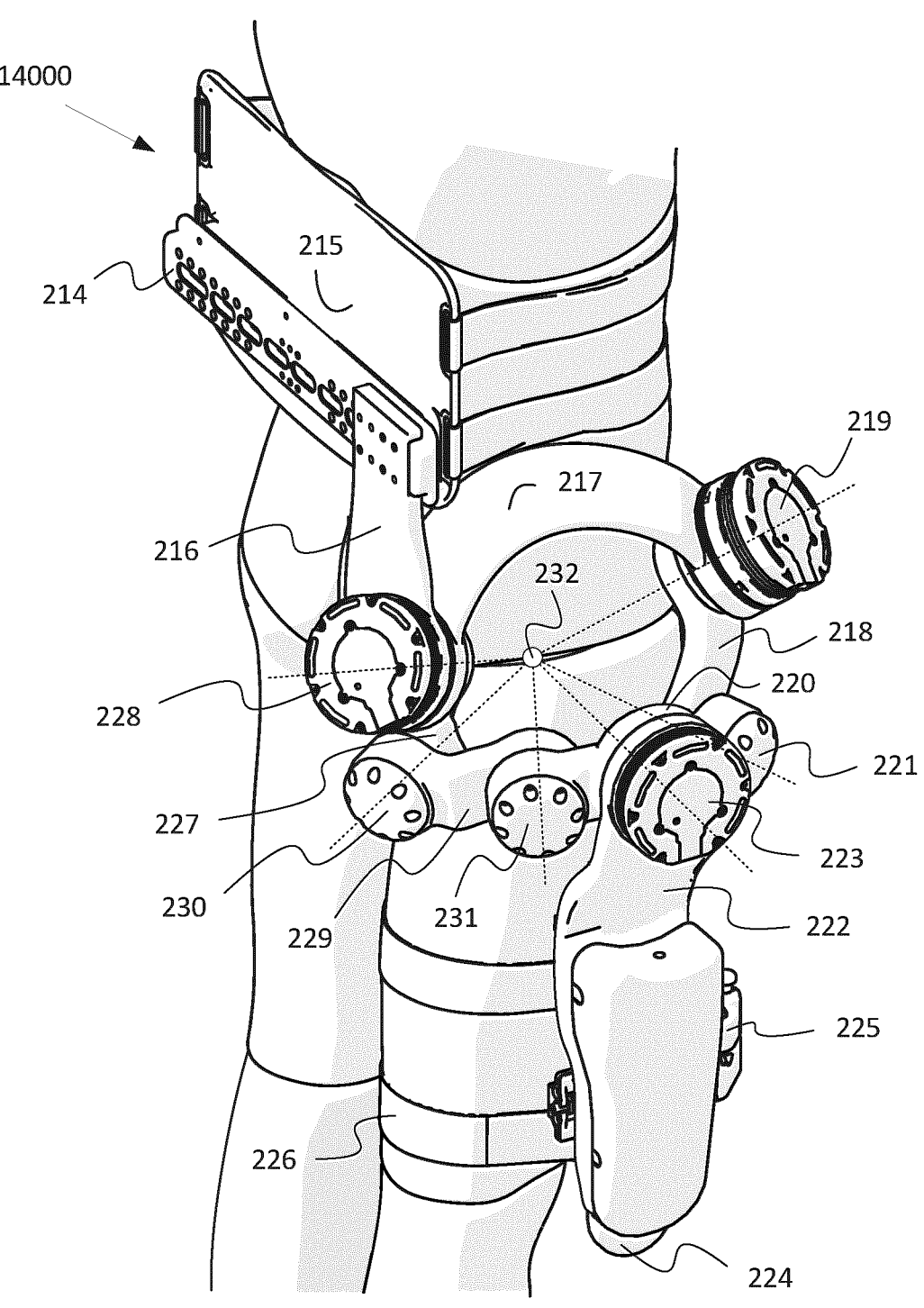
FIG. 23 is a perspective view of an example of another embodiment of a motion guiding device.

FIG. 23 illustrates a motion guiding device 14000 which employs an embodiment of the motion guiding device 1000. The motion guiding device includes a base structure 214, an orthotic structure 215 attached to the base 214, rotary joints 219, 221 and 223, linkages 217, 218, 220, 222, and an end-effector plate 224. The lattermost attaches to an interfacing linkage 225, which connects to an orthotic structure 226 that can be fastened to the user's thigh. The orthotic structure 215 can be fastened to the torso of the device's user. The base structure 214 also includes multiple interface locations such that the attachment position of a linkage 216 is adjustable in the direction lateral to the user's body. Linear adjustment exists between linkage pairs 222 and 224, 224 and 225, and 225 and orthotic structure 226. The adjustment directions between each pair are mutually orthogonal, thereby allowing freedom in the spatial attachment position of the orthotic structure 226 (and, therefore, the user's thigh) relative to linkage 222.

The linkage 216 is connected to the linkage 217, which in turn is connected to a linkage 218 via the rotary joint 219. In series sequence, the linkage 218 connects to a linkage 220 through a rotary joint 221, and then linkage 220 connects to the linkage 222 via the rotary joint 223. In addition, the assembly of the linkages 216 and 217 on the other side attaches to a linkage 227 through the rotary joint 228. Linkage 227 connects to a linkage 229 via a rotary joint 230, and then linkages 229 and 220 are connected through another rotary joint 231. The axes of all rotary joints 219, 221, 223, 228, 230, and 231 intersect at a common center-of-rotation point 232, and their combined rotations permit the end-effector plate 224 to move with three DOFs of rotation about that center-of-rotation point 232 relative to the base structure 214 without any other DOFs of motion (e.g., relative translation is not permissible once all adjustable attachments are fixed). The linkage 216 and the connected joint-linkage chain 227-231 comprise the actuation branch system.

A person skilled in the art could understand that the following linkage pairs are analogous between FIGS. 23 and 12: 217 and 42, 218 and 44, 220 and 46, and 222 and 48. Likewise, a person skilled in the art could understand that the following rotary joint pairs are analogous between FIGS. 23 and 12: 219 and 43, 221 and 45, and 223 and 47. Thus, in this embodiment of the device 6000, the linkage 216 and the connected joint-linkage chain 227-231 comprise the system 149 of FIG. 12. As depicted in FIG. 23, the rotary joints 219, 223, and 228 are actuated using electric motors to partially or completely assist movements about the user's hip joint. However, a person skilled in the art could understand that any other combination of the rotary joints 219, 221, 223, 228, 230, and 231 could be actuated by some means to provide partial or complete motion-assistance about the user's hip joint. Each of the actuators 219, 223 and 228 have sensor groups to gain actuator feedback and are connected (along with their respective sensor group) to a controller which, subsequently, connects to a user interface. The controller contains a processing unit and input/output unit and may contain motor drivers. The user intent is conveyed to the controller via the user interface. The connections of the actuators to this controller, the controller and the user interface have been omitted from this figure for clarity.

The device 14000 can be used as an augmentation device for an individual who possesses some degree of muscle control, or it may be semi-active and one or two of the actuators 219, 223 or 228 that correspond to any degrees of freedom that do not require assistance can be removed and replaced with a passive joint. Optionally, for the semi-active case, a sensor group can then be added to this passive joint to monitor the motion of that joint. The device may be powered by an on-board battery or any other power source. Additionally, a person skilled in the art would understand that alternative embodiments of the device 14000 can apply to other biological three DOF rotary joints provided that the underlying configuration of these embodiments allows the system to provide three DOFs of rotation about a center of rotation that can be (approximately) aligned with the center of rotation of the target joint and does not cause mechanical interference with the body of the user about that joint (for the target motions) and that all such embodiments and uses are also within the scope of this application.

Figure 24:
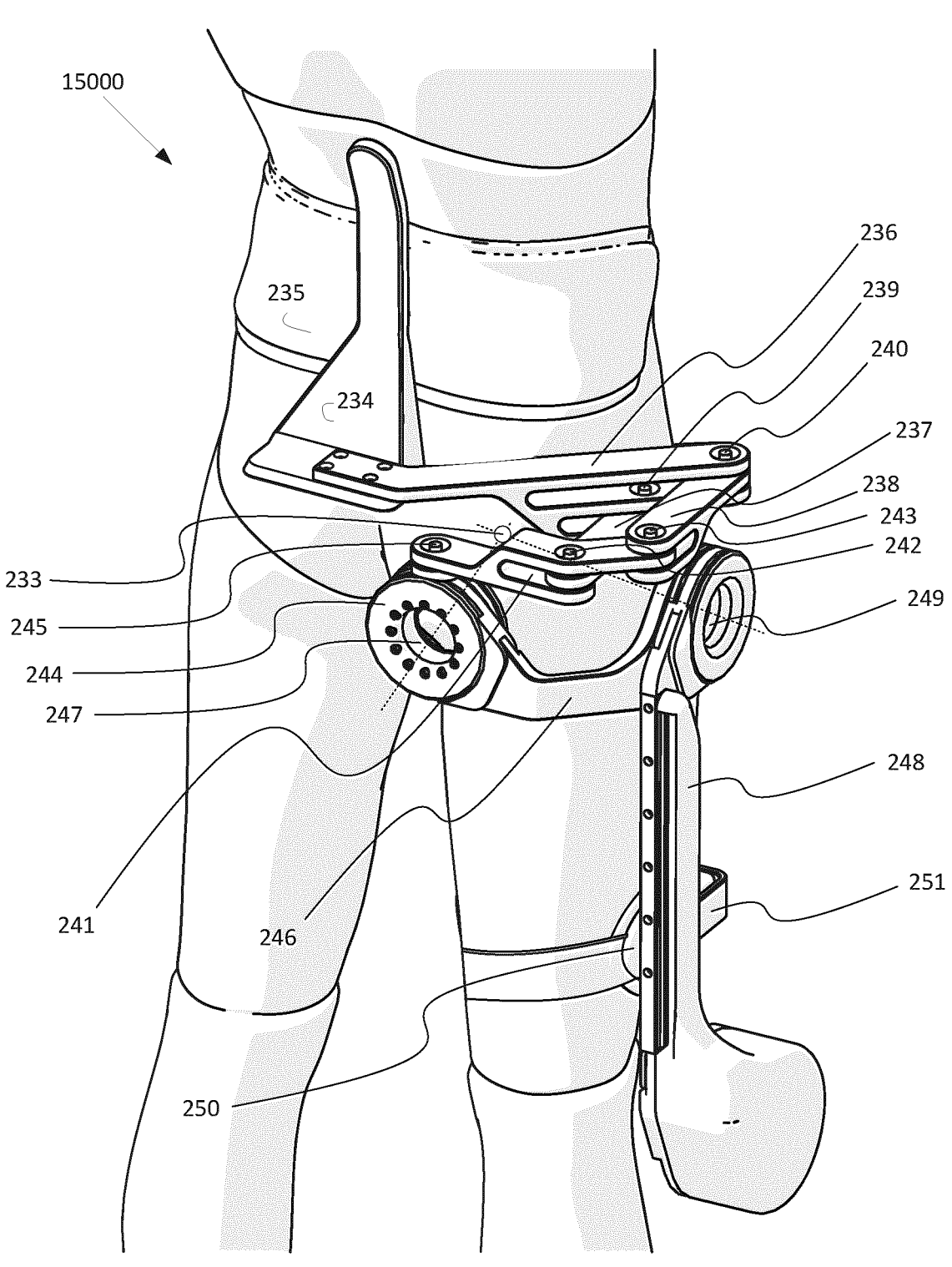
FIG. 24 is a perspective view of an example of yet another embodiment of a motion guiding device.

FIG. 24 illustrates another embodiment of a motion guiding device 15000 that allows three DOF rotations about a center of rotation 233, which may be approximately aligned with the center of rotation 1 of the user's target joint. The device 15000 includes a base 234 that at one end attaches to an orthotic structure 235, which in turn can be secured to the torso of the user. At another attachment surface, the base 234 is affixed to a linkage 236, which connects to linkages 237 and 238 via rotary joints 239 and 240, respectively. Linkages 237 and 238 subsequently connect to a linkage 241 through rotary joints 242 and 243, respectively. Linkage 241 then attaches to a linkage 244 via another rotary joint 245. Next, the linkage 244 connects to a linkage 246 via a rotary joint 247, and the linkage 246 attaches to an end-effector linkage 248 through a rotary joint 249. The end-effector linkage 248 is then connected to the thigh of the user via an orthotic structure 250 and a linkage 251, which has sliding adjustability along three orthogonal axes to allow spatial positioning of the orthotic structure 250 relative to end-effector linkage 248. Moreover, the attachments between the base 234 and adjacent parts (i.e., orthotic structure 235 and the linkage 236) also involve adjustability that allows the center of rotation 233 of the end-effector linkage 248 relative to base 234 to be (approximately) aligned with the center of rotation 1 of the user's target joint while maintaining ergonomic attachment of orthotic structure 235 to the user's torso. It is the combined motions of rotary joints 239, 240, 242, 243, 245, 247, and 249 that generate three DOF rotations of the device's end-effector linkage 248 relative to base 234. The axes of the lattermost two joints 247 and 249 intersect at the center of rotation point 233 during any posture of the system, but the others do not necessarily intersect it. The linkages and rotary joints 236-243 and 245 comprise a remote-center rotation mechanism so that the combined motion of the rotary joints 239, 240, 242, 243 and 245 generate a rotation motion with an axes of rotation that intersects with the axes of rotation of the rotary joints 247 and 249 at the remote center of rotation. Furthermore, as represented in this illustration, the positions of all those joints 239, 240, 242, 243, 245, 247, and 249 along with the geometries of linkages 236, 237, 238, 241, 244, 246, and 248 allow the system to be worn by the user without interfering with the user's body (for certain postures/positions). A person skilled in the art could understand that in other possible embodiments, the geometries of linkages 236, 237, 238, and 241 may be altered so to adjust the relative position of the remote center-of-rotation without departing from the scope of the present disclosure. Furthermore, the connection sequence of the remote-center rotation mechanism, rotary joint 247, and rotary joint 249 between the base 234 and the linkages 244, 246, and 248 can be rearranged in any order without departing from the scope of the present disclosure.

The device 15000 may be employed as an alternative motion guiding device to devices 1000 and/or 5000. The structure of the device 15000 is generally not completely load-bearing, it may be more suited to certain applications where this loading is not significant. For such applications, this structure can potentially be used in place of the structures 1000 and/or 5000 (and/or the other embodiments of these structures) depending on the method of actuation used. For example, the device 15000 may include actuated joints at rotary joint 249, rotary joint 247, and one or more of rotary joints 239, 240, 242, 243, or 245. Alternatively, device 15000 may be connected to one or more parallel actuation arms (i.e., as is shown for device 1000 in FIGS. 12-22) where device 15000 linkages 244, 246 and 248 are analogous to device 1000 linkages 44, 46 and 48, respectively, to which the various actuation branches shown in FIGS. 12-22 may attach.

Figure 25:
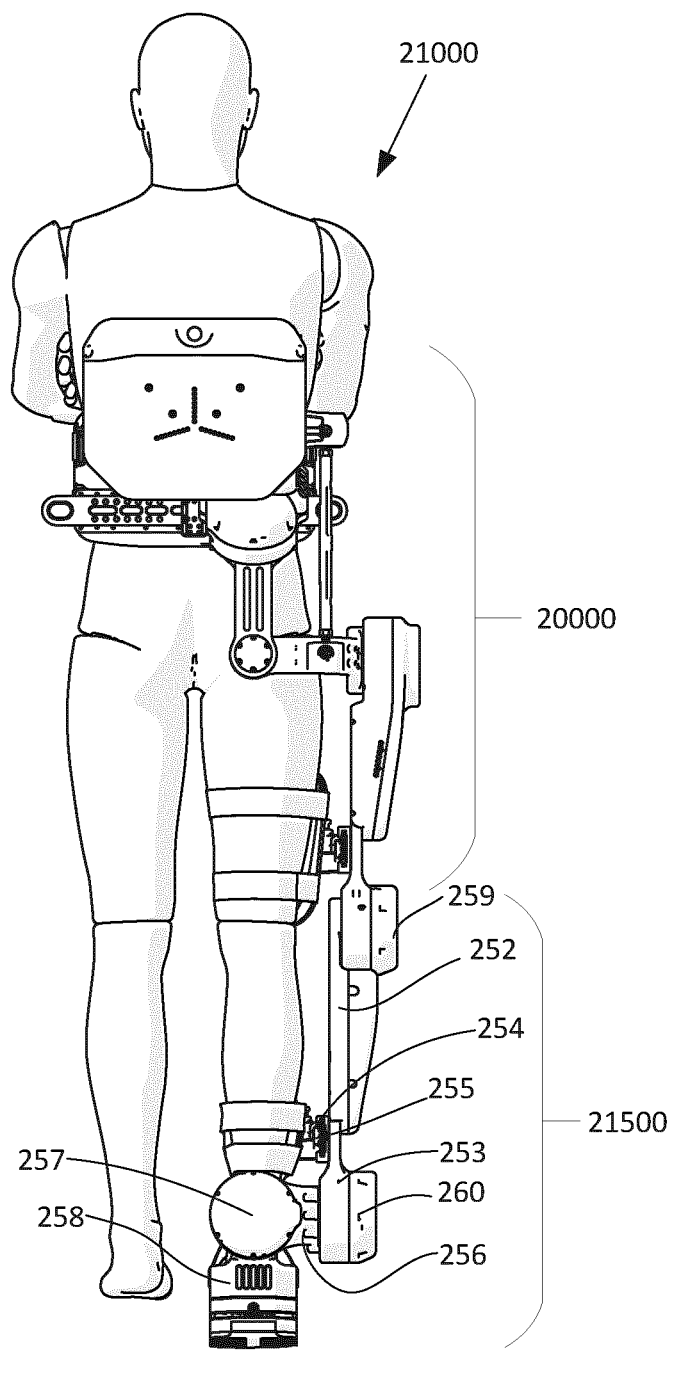
FIG. 25 shows an example of an embodiment of a motion guidance assistance system employing more than one motion guiding devices mounted on one leg of a user and viewed from a back of the user.

FIG. 25 illustrates a motion guidance assistance system 21000 that employs more than one motion guiding system. The system 21000 comprises a motion guiding device 9000 that is employed as a hip-joint motion guiding device 20000 which is connected in series with a lower-leg motion guiding system 21500. Thus, the motion guidance assistance system 21000 constitutes a lower-leg exoskeleton. The motion guiding device 20000 can be similar to the device 9000 of FIG. 7. The effector 81 (not shown) of the device 20000 is extended and connects to a rotary actuator 259 whose axis of rotation approximately aligns with the knee joint of the user. The actuator 259 then attaches to a linkage 252. The linkage 252 connects to a linkage 253 such that the point of connection can be adjusted, allowing the system to account for users with different lower-leg lengths. The linkage 253 then attaches to an orthotic system 255 via an adjustable linkage 254. Through the adjustable linkage 254 and the lower-leg orthotic system 255, the linkage 253 is connected to the lower leg of the user. The linkage 253 then connects to a rotary actuator 260. The rotary actuator 260 then connects to a rotary actuator 257 via a linkage 256. The rotary actuators 260 and 257 have axes of rotation that intersect at a point that is approximately aligned with the ankle joint of the user. The actuator 257 then connects to a footplate 258. The footplate 258 can attach to the user's foot via a strap system, or any other connecting system. The actuators 259, 260 and 257 can include sensor groups so as to obtain actuator feedback and these actuators 259, 260 and 257 (and their respective sensor groups) are connected to the control system 95 of FIG. 7 (which is further connected to the user interface unit 99) to which the actuators of the device 20000 are also connected. These connections are not shown in FIG. 25. This control system 95 (see FIG. 7) can be located in the backpack unit 102 (see FIG. 8). The device is powered by a battery unit also located in the backpack unit (see FIG. 8).

The footplate 258 can include a force sensor, torque sensor, force/torque sensor, touch sensor or any other kind of sensor (or multiple instances of any of the aforementioned sensors) in order to obtain feedback for positioning and/or balance. Any of the linkages may contain inertial measurement units, strain gauges, rotary encoders or any other type of sensor for obtaining control feedback. The user interface may contain any sensor(s) such as those mentioned as potentially comprising the user interface system 99 of FIG. 7.

A person skilled in the art could understand that any other system that provides actuation of the knee and ankle joints of the user can be used in place of the lower leg system 21500 and that all such combinations are within the scope of this patent. In the event that the motion guiding assistance system 21000 is employed for motion assistance of a user with partial motor control, certain actuators may be replaced with passive joints according to the degrees of freedom of the user's lower body that do not require actuation. In the event that the axis of rotation of the actuator 259 is not aligned with the knee joint of the user or the actuators 260 and/or 257 are not aligned with the ankle joint of the user, the lower leg and foot connections can be made compliant to account for this misalignment by adjusting the connections. A person skilled in the art could understand that other devices presented herein could act as the hip actuation unit

20000 (such as the device 11000) in place of the device 9000 and that all such combinations are within the scope of this application.

Figure 26:
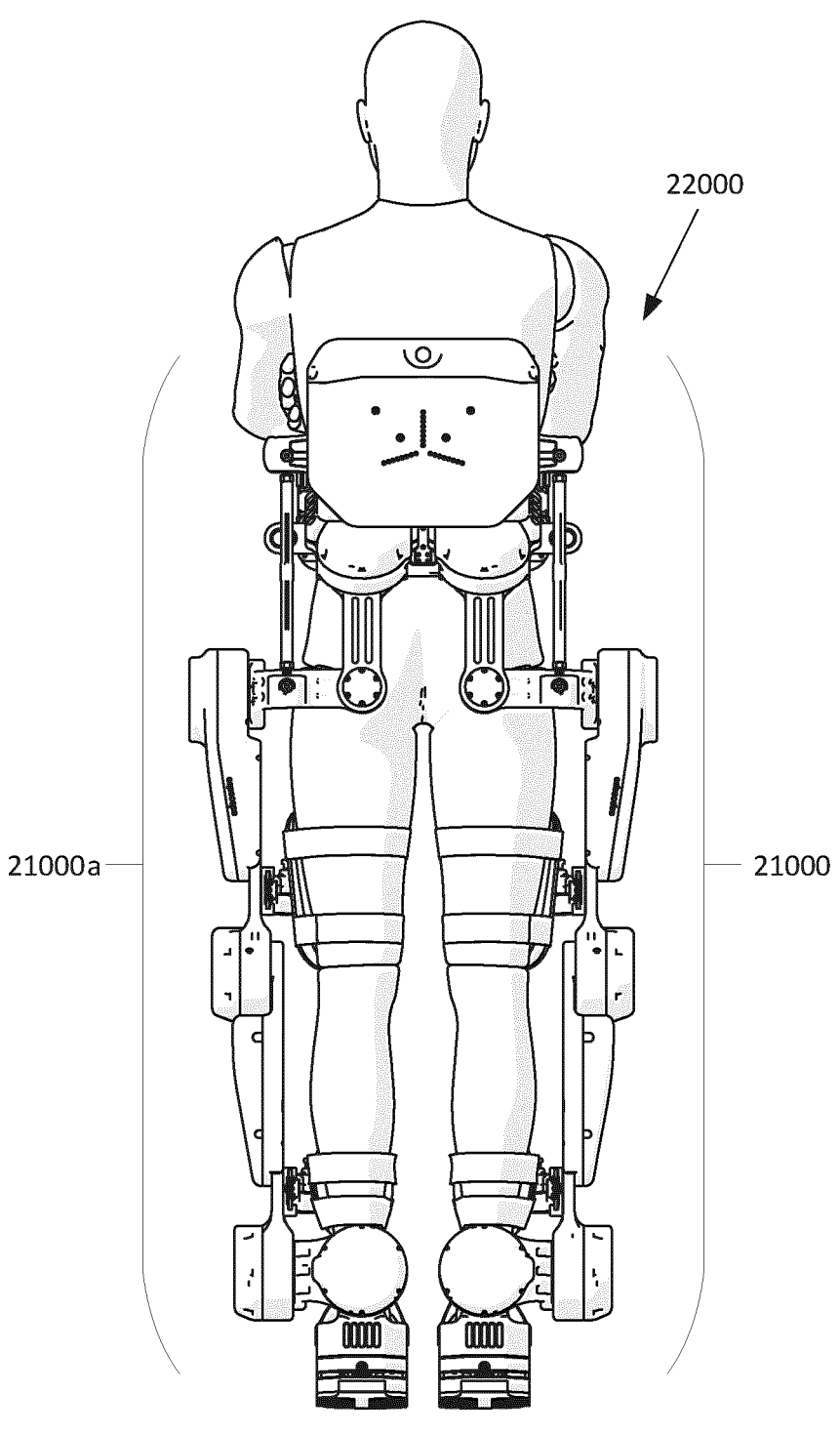
FIG. 26 shows an example of an embodiment of a motion guidance assistance system employing more than one motion guiding device mounted on two legs of a user and viewed from the back of the user.

FIG. 26 illustrates a full-leg exoskeleton system 22000 similar to the system 21000 of FIG. 25 where a separate system 21000, 21000a is used for each leg of the user and thus provide a full, lower-body, motion guidance assistance system 22000 (constituting a full lower-body exoskeleton). In this system, the base 73 and the backpack 102 of the device 9000 (which acts as the hip-joint motion guiding device 20000 of the embodiment of FIG. 25) of FIG. 7, which is a subset of the system 21000, is shared with the second device 9000, which is a subset of the system 21000a, thus connecting the two systems 21000 and 21000a. All actuators (and the sensor groups of these actuators) of the system 22000 are connected to a central control system (which is, in turn, is connected to a general user interface) located in the backpack unit 102 of FIG. 7 (in this scenario, the control systems 95 and the user interface systems 99 of both devices 9000, which act as subsets of the systems 21000 and 21000a respectively, are replaced with the central control unit and the general user interface).

Figure 27:
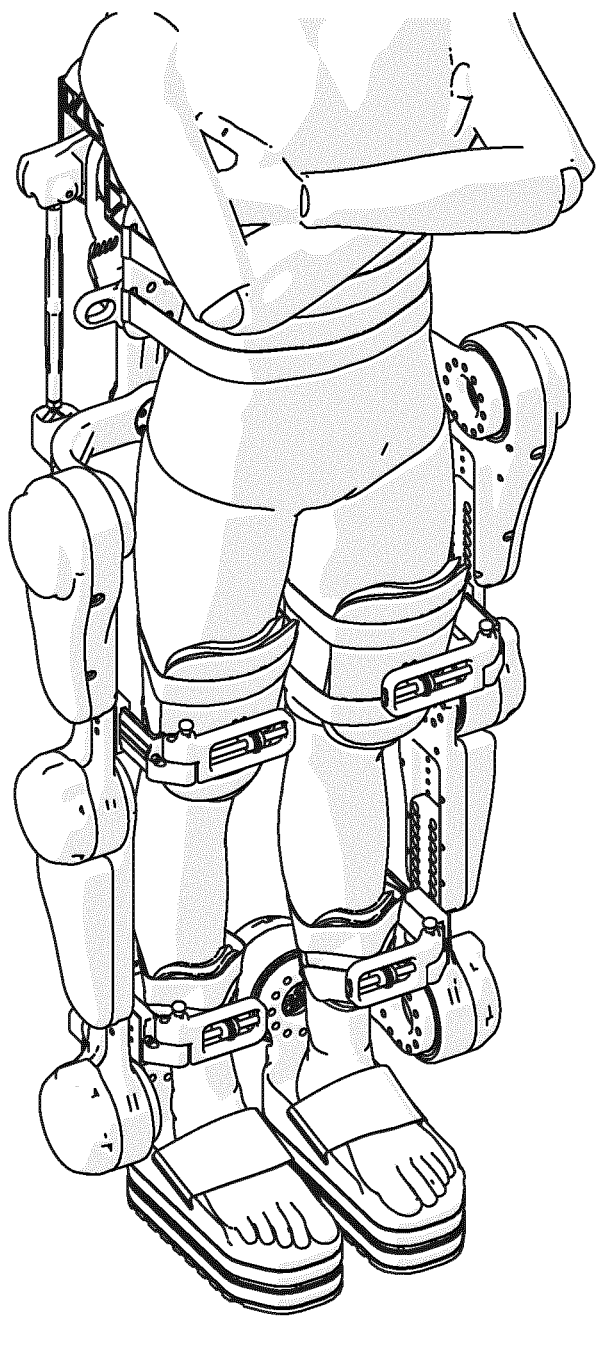
FIG. 27 is a perspective front view of the motion guidance assistance system of FIG. 26.

FIG. 27 illustrates a front view of the motion guidance assistance system 22000. The footplates can include force sensors, torque sensors, force/torque sensors, touch sensors or any other kind of sensor in order to obtain feedback for positioning and/or balance. Any of the linkages may contain inertial measurement units, strain gauges, rotary encoders or any other type of sensor for obtaining control feedback. The motion guidance assistance system 22000 is load-bearing as certain loads applied to the exoskeleton (such as the weight of a battery contained within the backpack) can be transferred to other points of the exoskeleton (such as the contact point between the foot of the exoskeleton and the ground) without necessarily transferring through the body of the user wearing the system.

A person skilled in the art would understand that any of the previously mentioned alternative forms of the motion guiding assistance system 21000 of FIG. 25 could be used in place of current motion guiding assistance system 21000 and/or 21000a (where certain connecting components may be shared) and that all such combinations are within the scope of this patent. In the event that the motion guiding assistance system 22000 is employed for motion assistance of a user with partial motor control, certain actuators may be replaced with passive joints according to the degrees of freedom of the user's lower body that do not require actuation.

Figure 28:
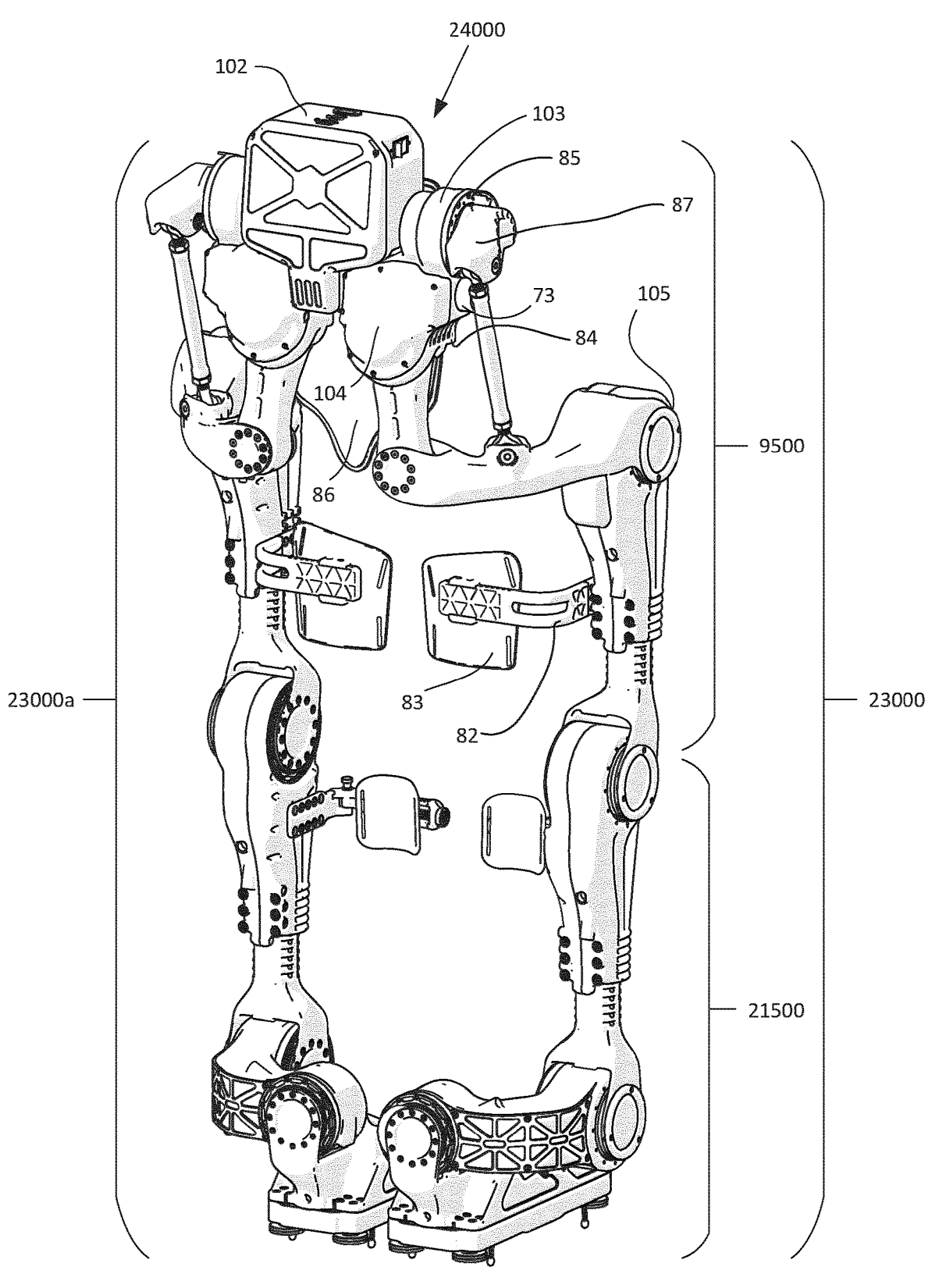
FIG. 28 shows an example of an embodiment of a motion guidance assistance system employing more than one motion guiding device comprising a two-legged lower-body exoskeleton viewed from the back.

FIG. 28 illustrates a full-leg exoskeleton system 24000 that employs more than one motion guiding system. The system 24000 comprises a motion guiding device 9500 that is employed as a hip joint motion guiding device. The motion guiding device 9500 can be similar to the device 9000 of FIG. 7. However, whereas in FIG. 7 the device 9000 employs an embodiment of the motion guiding device 1000 depicted as the motion guiding device 5000, which has orthogonal joint axes 40 and 41, the joint axes of device 9500 in FIG. 28 are not orthogonal, as is depicted by axes 22, 23, and 24 of device 1000 in FIG. 2. Moreover, in FIG. 28, the actuator 85 and linkage 87 are shown to attach to mount 84 with a different orientation with respect to the rest of the device 9500 than is depicted for device 9000 in FIG. 7. A person skilled in the art could understand that the attachment of actuator 85 (and subsequently linkage 87) to mount 84 could have any spatial orientation with respect to the rest of the device 9500 and that any such alternative attachment orientations are also within the scope of this application. Additionally, whereas the adjustable linkage 82 and orthotic system 83 extend towards the front of a user's thigh in the depiction of device 9000 FIG. 7, the depiction of device 9500 in FIG. 28 shows the adjustable linkage 82 and orthotic system 83 extend towards the back of a user's thigh. A person skilled in the art could understand that the adjustable linkage 82 and orthotic system 83 could have any spatial orientation with respect to the rest of the device 9500 and that any such alternative attachment orientations are also within the scope of this application.

The motion guiding device 9500 contained within motion guidance assistance system 24000 is connected in series with a lower-leg motion guiding system 21500, similar to the connection of system 21500 to motion guiding device 20000 in system 21000. Furthermore, a separate system 23000, 23000*a* is used for each leg of the user and thus provide a full, lower-body, motion guidance assistance system 24000 (constituting a full lower-body exoskeleton). In this system, the base 73, orthotic system 86, and the backpack 102 of the device 9500, which is a subset of the system 23000, is shared with the second device 9500, which is a subset of the system 23000*a*, thus connecting the two systems 23000 and 23000*a*. All actuators (and the sensor groups of these actuators) of the system 24000 are connected to a central control system (which is, in turn, is connected to a general user interface) located in the backpack unit 102 of FIG. 28 (in this scenario, the control systems 95 and the user interface systems 99 of both devices 9500, which act as subsets of the systems 23000 and 23000*a* respectively, are replaced with the central control unit and the general user interface).

Figure 29:
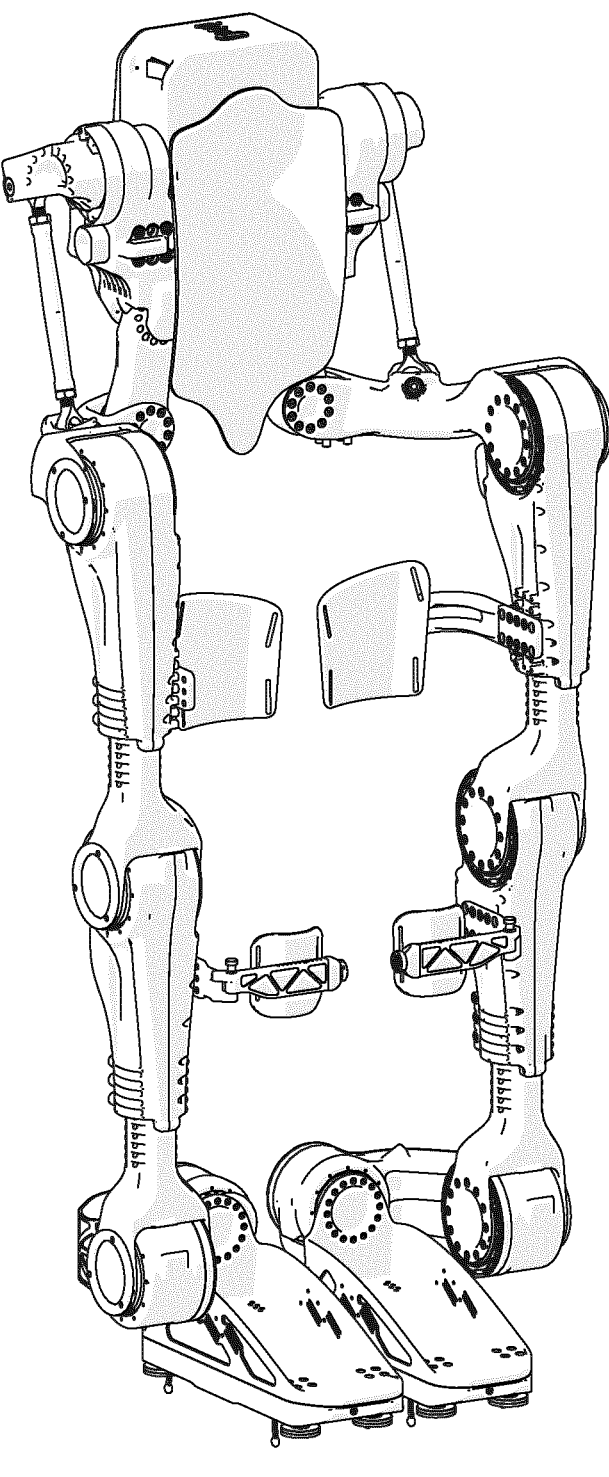
FIG. 29 is a perspective front view of the motion guidance assistance system of FIG. 28.

FIG. 29 illustrates a front view of the motion guidance assistance system 24000. The footplates can include force sensors, torque sensors, force/torque sensors, touch sensors or any other kind of sensor in order to obtain feedback for positioning and/or balance. Any of the linkages may contain inertial measurement units, strain gauges, rotary encoders or any other type of sensor for obtaining control feedback. The motion guidance assistance system 24000 is load-bearing as certain loads applied to the exoskeleton (such as the weight of a battery contained within the backpack) can be transferred to other points of the exoskeleton (such as the contact point between the foot of the exoskeleton and the ground) without necessarily transferring through the body of the user wearing the system.

A person skilled in the art could understand that any other system that provides actuation of the knee and ankle joints of the user can be used in place of the lower leg system 21500 (which is a subset of the device 23000 and/or 23000*a*) and that all such combinations are within the scope of this patent. A person skilled in the art could understand that other devices presented herein (such as the device 11000) could be used in place of the device 9500 (which is a subset of the device 23000 and/or 23000*a*) and that all such combinations are within the scope of this application.

While the motion guiding devices 1000, 5000, 7000, 9000, 11000, 14000 and any of the devices or embodiments mentioned as being within the scope of this application or any of the embodiments of the general devices of FIGS. 12-22 (stated as being within the scope of this application) have generally been presented as 3-DOF mechanisms, a person skilled in the art could understand that these devices could apply to certain 2-DOF and 1-DOF applications as well by potentially replacing certain passive joints with fixed connections and/or by reducing the number of actuators accordingly and that all such embodiments are within the scope of this patent.

As stated previously, while the devices 1000, 5000, 7000, 9000, 11000, 14000 and any of the devices or embodiments mentioned as being within the scope of this application or any of the embodiments illustrated in FIGS. 12-22 (stated as being within the scope of this application) have generally been depicted as guiding the hip joint of the user, a person skilled in the art would understand that devices of similar form can also actuate other biological joints (such as the ankle or the wrist) and that all such embodiments are within the scope of this application.

While the embodiments presented in this application often specify the positions of actuators or the joints to which actuation is applied, a person skilled in the art would understand that actuation might be applied, or moved to, other joints which are currently depicted as passive and, in turn, joints which are depicted as active can potentially be replaced with passive joints, and that all such embodiments are within the scope of this application.

While not depicted in the embodiments described above, a person skilled in the art could understand that any of the mentioned joints (whether passive or active) may also include passive energy storage or energy dissipative elements, such as springs or dampers, and that all such embodiments are within the scope of this application.

While the devices 1000, 5000, 7000, 9000, 11000, 14000 (and any mentioned embodiments of these) and the various embodiments illustrated in FIGS. 12-22, are generally presented such that joint systems or structures that create single degree of freedom remote centers of rotation (such as gonio ways or curvilinear joints) are not necessarily employed (due to possible advantages in mechanical feasibility in not doing so), a person skilled in the art could understand that such structures/systems could be used in place of particular joints (to avoid mechanical interferences, for example) in the embodiments presented (or mentioned as being within the scope of the application) and that all such embodiments are within the scope of the application.

While all connections that are depicted are generally depicted as being wired connections, a person skilled in the art could understand that certain of these connections may be made wireless and that all such embodiments are within the scope of this application.

While certain actuators may be identified as being rotary or linear, this is not meant to restrict the manner in which these actuators generate the rotary or linear motion. For example, a linear actuator can be connected across two components that are joined by a rotary joint in which case the linear motion of the linear actuator has the effect of creating a rotary motion at the joint to be actuated. Since such a system creates a rotary motion at the joint to be actuated, this system, even though it might include a linear actuator, might fulfill the position of a rotary actuator. As such, generally, the identification of an actuator as linear or rotary refers to the motion of the joint that the actuator actuates but is not meant to restrict the nature of the system that provides this actuation. A person skilled in the art could see that there are many actuator systems that could be applied to the embodiments presented in this application and that all these embodiments are within the scope of the application.

In, general, throughout the application, certain linkages and/or other components may be said to have an adjustable connection point with respect to other linkages and/or other components. However, it is understood that any other linkages and/or components (that have not been stated as having adjustability) may also have adjustability either with regards to their connection point with another linkages and/or components or with regards to their own geometry. To say that a linkage may have adjustability with regards to its own geometry is generally held to mean that one or more dimensions may be adjustable through some mechanism (this can also include dividing the linkage into two or more connected linkages which may have adjustable attachment points or any other mechanism). Alternatively, it is understood that certain components/linkages which have been said to have adjustability in this application may be replaced with non-adjustable linkages/components and, in some cases, this may include the merging two or more linkages and/or components that were previously connected via an adjustable connection. A person skilled in the art would understand that all such variations are within the scope of this application.

Additionally, while certain components may be herein depicted as being separate bodies that are rigidly connected by some system/mechanism, a person skilled in the art could understand that these components/bodies could be merged into one component/body. Conversely, a person skilled in the art could understand that components that are presented as single bodies may be replaced with two or more components that are rigidly connected but together maintain the relevant properties of the body/component that they replace. A person skilled in the art could understand that all such combinations are within the scope of this patent.

In general, throughout the application, certain joints or linkages or bodies or other components may have been said to have sensing elements (such as encoders, inertial measurement units or other sensors), however, it is understood that any joints or linkages or bodies or other components (including those where the inclusion of sensors may not have been mentioned) may include sensors, such as rotary encoders, inertial measurement units or any other type of sensor. A person skilled in the art would understand that all such variations are within the scope of this application.

In one implementation, any of the motion guidance devices mentioned can be used to assist users that may have mobility issues in one of more lower-body joints by allowing positioning of the joint segments over which the user may have diminished (or non-existent) control, or, by providing assistive motor responses between body segments to stabilize a user at one or more joints or to provide augmentation of a user's action where, for example, the user might have weakened muscles at one or more joints.

In another implementation, the motion assistance system of the present invention can be employed as a robotic rehabilitation tool. For example, a physiotherapist can secure a patient to the motion assistance exoskeleton system using straps (or any other attachment method) in order to support the weight of the user and can then program the exoskeleton to help patients' limb(s) through some repetitive exercises.

In one embodiment, the lower-body motion guidance assistance system can be connected to an upper body exoskeleton system so as to provide motion guidance (or assistance) of the entire body.

In one implementation, the motion assistance system can be used as a motion capture device. The system can comprise a motion guiding device or system for detecting and/or guiding motions of any number of target joints. The motion capture system is secured to a user using mounting means such as, for example, straps and orthotics. In this aspect, the actuators of the motion generator and the motion transfer system (if any) may or may not be present. For example, the actuators can be replaced by sensors, e.g. encoders, linear/rotary potentiometers, etc., and a kinematic algorithm programmed in the controller can use the data to calculate the accurate orientation of the human target joints and the body segments' position. The user can produce a motion at any or all of the joint targets and the plurality of sensors can detect such motion (produced by the user) by measuring the motion (i.e., position and orientation) of the passive joints of the motion capturing system.

Alternatively, in another embodiment, the active joints of the motion guiding devices of the previous embodiment may not be omitted and the resulting motion capture device can communicate with an external Virtual Reality (VR) or an Augmented Reality (AR) system. In this case, the actuators do not create any resistance until the user tactilely contacts something in the virtual or augmented reality environment, at which time the actuators engage to emulate a tactile response (e.g., force feedback) to a virtual entity. For example, this embodiment can be applied in the gaming industry where a gamer may need to have a better interaction with the environment.

The controller can be pre-programmed to command the actuators to resist motions in certain directions/orientations or to apply forces in certain directions/orientations. The motion guiding devices can also be used in training applications, such as sports, where inaccurate/incorrect motions will be restricted while the accurate/correct motions will be facilitated (or not interfered with) by the exoskeleton.

In another embodiment, the exoskeleton's actuators can be replaced by lockable joints. In this arrangement, an operator can manually move the structure to be positioned until the desired position is achieved while the motion guiding device is attached. The actuators will not create any resistance against the motion until the desired position is reached. The operator can then lock the lockable joints to maintain the position.

In another embodiment, the full body exoskeleton or its subcomponents (e.g., hip subcomponent) can be used as a motion augmentation device, where the controller can comprise a user intent detection algorithm which can monitor the users activity/input via signals received from sensors, such as one or more encoders, IMU systems, foot force sensors, EMG sensors or any other sensors. The controller will then command the exoskeleton or its subcomponents to assist the lower or upper body in performing particular motions. The system can behave as an active or passive device as needed for a particular action.

While particular elements, embodiments and applications of the present disclosure have been shown and described, it will be understood that the scope of the disclosure is not limited thereto, since modifications can be made by those skilled in the art without departing from the scope of the present disclosure, particularly in light of the foregoing teachings. Thus, for example, in any method or process disclosed herein, the acts or operations making up the method/process may be performed in any suitable sequence and are not necessarily limited to any particular disclosed sequence. Elements and components can be configured or arranged differently, combined, and/or eliminated in various embodiments. The various features and processes described above may be used independently of one another or may be combined in various ways. All possible combinations and sub-combinations are intended to fall within the scope of this disclosure. Reference throughout this disclosure to "some embodiments," "an embodiment," or the like, means that a particular feature, structure, step, process, or characteristic described in connection with the embodiment is included in at least one embodiment. Thus, appearances of the phrases "in some embodiments," "in an embodiment," or the like, throughout this disclosure are not necessarily all referring to the same embodiment and may refer to one or more of the same or different embodiments.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without operator input or prompting, whether these features, elements and/or steps are included or are to be performed in any particular embodiment. No single feature or group of features is required for or indispensable to any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

The example results and parameters of the embodiments described herein are intended to illustrate and not to limit the disclosed embodiments. Other embodiments can be configured and/or operated differently than the illustrative examples described herein.

The invention claimed is:

1. A motion guiding device that allows three degree-of-freedom (DOF) motion about a remote center of rotation that is approximately aligned to a center of rotation of a target joint of a target body, the device comprising:

a base structure configured to be connected to the target body via a base linkage and a base orthotic structure;

at least three rotary joints interconnected with a network of linkages, the network of linkages configured to not mechanically interfere with the target body, one end of the network of linkages being connected to the base structure, at least one rotary joint being unaligned with an axis of motion of the target joint, each of the rotary joints providing one DOF of rotary motion about a respective axis;

an effector plate being attached to the network of linkages at the other end of the network of linkages, an attachment point of the effector plate being adjustable via a plate adjustment system, the effector plate being configured to be connected to the target body via an adjustable plate orthotic system, a point of connection of the effector plate to the target body being spaced apart from a point of connection between the base structure and the target body, combined motions of the at least three rotary joints and the network of linkages generate three-DOF rotation of the effector plate about the remote center of rotation that is approximately aligned with the center of rotation of the target joint; and at least one parallel branch operably coupled at one end to the motion guiding device at a first point of attachment and to a second point of attachment at an opposite end, the at least one parallel branch comprising at least one actuator, one or more joints and a system of linkages, the at least one parallel branch is configured to indirectly actuate motion in at least one of the three rotary joints and actuate motion in the effector plate, wherein the at least one parallel branch is operably coupled to one linkage of the network of linkages at the first point of attachment and the second point of attachment of the parallel branch is connecting the parallel branch to the base structure.

2. The motion guiding device of claim 1, wherein a point of attachment of the base linkage and the base orthotic structure being adjustable via adjustment system.

3. The motion guiding device of claim 1, wherein the axis of rotation of at least one rotary joint not being orthogonal to any adjacent axes.

4. The motion guiding device of claim 1 comprising three rotary joints and wherein each axis of the three rotary joints intersects at the remote center of rotation.

5. The motion guiding device of claim 1, wherein axis of two of the rotary joints intersects at the remote center of rotation, the motion guiding device further comprising a remote-center rotation mechanism having two or more rotary joints interconnected with a network of linkages, the combined motion of the two or more rotary joints of the remote-center rotation mechanism generating a rotation motion with an axes of rotation that intersects with the axes of rotation of the two rotary joints at the remote center of rotation.

6. The motion guiding device of claim 1, wherein at least one of the rotary joints is a rotary actuator to actuate the at least one rotary joint.

7. The motion guiding device of claim 6 further comprising a controller comprising an input unit, a processing unit and an output unit, the output unit operably coupled with the drive of the at least one rotary actuator to direct motion of the motion guiding device.

8. The motion guiding device of claim 7, further comprising a plurality of sensors to measure a position and/or orientation of the three joints or the network of linkages, as well as the forces/torques acting between the linkages and the joints and the forces/torques acting between the motion guiding device and its environment.

9. The motion guiding device of claim 7, further comprising a user interface in communication with the input unit to receive instructions from an operator.

10. The motion guiding device of claim 1 further comprising at least one additional actuator branch operably coupled at one end to one linkage of the network of linkages at a first point of attachment and to a second point of attachment at the opposite end, the second point of attachment of the at least one additional actuator branch is connecting the at least one additional actuator branch to the effector plate or to another linkage of the network of linkages, the at least one additional actuator branch comprising at least one actuator, one or more joints and a system of linkages, the at least one additional actuator branch is configured to actuate motion in at least one of the 3 rotary joints and the effector plate.

11. The motion guiding device of claim 1 further comprising at least one additional actuator branch operably coupled at one end to the base structure at a first point of attachment and at the opposite end coupled to the effector plate at a second point of attachment, the at least one additional actuator branch comprising at least one actuator, one or more joints and a system of linkages, the at least one actuator branch is configured to actuate motion in at least one of the three rotary joints and the effector plate.

12. The motion guiding device of claim 1, wherein the at least one actuator in the at least one parallel branch is a rotary actuator or a linear actuator.

13. The motion guiding device of claim 1 wherein the at least one joint in the at least one parallel branch is selected from a rotary joint, universal, spherical joint or a linear joint.

14. The motion guiding device of claim 1, wherein a geometry of the network of linkages being adjustable to adjust a position of the remote center of rotation in three dimensions.

15. A motion guidance assistance system, the system comprising:

a motion guiding device as claimed in claim 1;

at least one additional joint system connected in series with the motion guiding device as claimed in claim 1; and a controller in communication with the motion guiding device and the at least one additional joint system, the controller being configured to actuate and coordinate motions of the motion guiding device and the at least one additional joint system.

16. The motion guidance assistance system of claim 15 further comprising:

a second motion guiding device as claimed in claim 1; and a second additional joint system connected in series with the second motion guiding device as claimed in claim 1;

wherein the controller is further in communication with the second motion guiding device and the second additional joint system, the controller being configured to actuate and coordinate motions of the second motion guiding device and the second additional joint system.

* * * * *